US012669886B2

(12) United States Patent
Kimura et al.

(10) Patent No.: US 12,669,886 B2
(45) Date of Patent: Jun. 30, 2026

(54) INPUT/OUTPUT PANEL, INPUT/OUTPUT DEVICE, AND SEMICONDUCTOR DEVICE

(71) Applicant: SEMICONDUCTOR ENERGY LABORATORY CO., LTD., Atsugi (JP)

(72) Inventors: Hajime Kimura, Atsugi (JP); Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 19/230,177

(22) Filed: Jun. 6, 2025

(65) Prior Publication Data

US 2025/0298478 A1 Sep. 25, 2025

Related U.S. Application Data

(63) Continuation of application No. 18/673,733, filed on May 24, 2024, now Pat. No. 12,353,658, which is a (Continued)

(30) Foreign Application Priority Data

Jul. 13, 2016 (JP) .................................. 2016-138237

(51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G02F 1/134363* (2013.01);
(Continued)

(58) Field of Classification Search
CPC .... G06F 3/0412; G06F 3/0445; G06F 3/0446; G06F 2203/04108; G02F 1/3338;
(Continued)

(56) References Cited

U.S. PATENT DOCUMENTS 6,954,239 B2 10/2005 Kato et al.
7,859,521 B2 12/2010 Hotelling et al.
(Continued)

FOREIGN PATENT DOCUMENTS

CN 001482585 A 3/2004
CN 001714380 A 12/2005
(Continued)

OTHER PUBLICATIONS

Chinese Office Action (Application No. 201710545808.1) Dated May 6, 2021.
(Continued)

*Primary Examiner* — Michael A Faragalla
(74) *Attorney, Agent, or Firm* — Fish & Richardson P.C.

(57) ABSTRACT

An input/output device includes a first sensor electrode and a second sensor electrode. In addition, the input/output device includes a first electrode and a second electrode which are electrodes for a display element, and a substrate sandwiched between the first sensor electrode and the second sensor electrode. The second sensor electrode is formed concurrently with the first electrode using the same material. The input/output device sensors a change in capacitance of a capacitor formed between the first sensor electrode and the second sensor electrode. Furthermore, a third sensor electrode to which a floating potential is applied may be provided to overlap with the first electrode. In the input/output device, either a liquid crystal element or a light-emitting element may be used, or both the liquid crystal element and the light-emitting element may be used.

12 Claims, 22 Drawing Sheets

Related U.S. Application Data continuation of application No. 18/312,104, filed on May 4, 2023, now Pat. No. 12,008,185, which is a continuation of application No. 17/751,782, filed on May 24, 2022, now Pat. No. 11,675,452, which is a continuation of application No. 16/208,638, filed on Dec. 4, 2018, now Pat. No. 11,372,488, which is a continuation of application No. 15/645,019, filed on Jul. 10, 2017, now Pat. No. 10,152,160.

(51) Int. Cl.

| | |
|---|---|
| *G02F 1/1343* | (2006.01) |
| *G02F 1/1368* | (2006.01) |
| *G06F 3/044* | (2006.01) |
| *G02F 1/1335* | (2006.01) |

(52) U.S. Cl.
CPC .......... *G02F 1/1368* (2013.01); *G06F 3/0445* (2019.05); *G06F 3/0446* (2019.05); *G02F 1/133553* (2013.01); *G02F 2201/44* (2013.01); *G06F 2203/04108* (2013.01)

(58) Field of Classification Search
CPC ............. G02F 1/134363; G02F 1/1368; G02F 1/133553; G02F 2201/44
See application file for complete search history.

(56) References Cited

U.S. PATENT DOCUMENTS

| | | | |
|---|---|---|---|
| 7,920,129 B2 | 4/2011 | Hotelling et al. |
| 8,199,127 B2 | 6/2012 | Mamba et al. |
| 8,599,146 B2 | 12/2013 | Utsunomiya et al. |
| 8,730,184 B2 | 5/2014 | Nirmal et al. |
| 8,786,557 B2 | 7/2014 | Noguchi et al. |
| 8,823,893 B2 | 9/2014 | Yamazaki |
| 8,891,048 B2 | 11/2014 | Park et al. |
| 9,052,768 B2 | 6/2015 | Kurasawa et al. |
| 9,122,359 B2 | 9/2015 | Ishizaki et al. |
| 9,128,568 B2 | 9/2015 | Long et al. |
| 9,140,922 B2 | 9/2015 | Noguchi et al. |
| 9,244,323 B2 | 1/2016 | Yamazaki |
| 9,317,166 B2 | 4/2016 | Miyazaki et al. |
| 9,323,403 B2 | 4/2016 | Ma et al. |
| 9,335,882 B2 | 5/2016 | Kurasawa et al. |
| 9,372,569 B2 | 6/2016 | Teramoto |
| 9,417,475 B2 | 8/2016 | Fukutome et al. |
| 9,455,281 B2 | 9/2016 | Sato |
| 9,471,188 B2 | 10/2016 | Funayama |
| 9,495,044 B2 | 11/2016 | Kida et al. |
| 9,581,849 B2 | 2/2017 | Tanabe et al. |
| 9,614,019 B2 | 4/2017 | Miyake |
| 9,619,098 B2 | 4/2017 | Ishizaki et al. |
| 9,620,525 B2 | 4/2017 | Yamazaki |
| 9,666,604 B2 | 5/2017 | Kimura et al. |
| 9,746,977 B2 | 8/2017 | Ikeda et al. |
| 9,817,536 B2 | 11/2017 | Shishido et al. |
| 9,933,872 B2 | 4/2018 | Watanabe et al. |
| 10,025,422 B2 | 7/2018 | Kurasawa et al. |
| 10,162,470 B2 | 12/2018 | Ishizaki et al. |
| 10,185,449 B2 | 1/2019 | Shishido et al. |
| 10,216,345 B2 | 2/2019 | Ikeda et al. |
| 10,256,254 B2 | 4/2019 | Yamazaki |
| 10,386,984 B2 | 8/2019 | Ishizaki et al. |
| 10,528,205 B2 | 1/2020 | Ikeda et al. |
| 10,564,742 B2 | 2/2020 | Hwang et al. |
| 10,592,059 B2 | 3/2020 | Kurasawa et al. |
| 2006/0072047 A1 | 4/2006 | Sekiguchi |
| 2009/0213090 A1 | 8/2009 | Mamba et al. |
| 2010/0026659 A1 | 2/2010 | Long et al. |
| 2010/0289765 A1 | 11/2010 | Noguchi et al. |
| 2011/0292095 A1 | 12/2011 | Yoshida. et al. |
| 2014/0001025 A1 | 1/2014 | Hinata |
| 2015/0022500 A1* | 1/2015 | Kita .................. G02F 1/134336 |
| | | 345/87 |
| 2015/0130751 A1 | 5/2015 | Teraguchi |
| 2015/0310793 A1 | 10/2015 | Kawashima et al. |
| 2015/0346897 A1 | 12/2015 | Irri et al. |
| 2016/0109998 A1 | 4/2016 | Watanabe |
| 2016/0154263 A1 | 6/2016 | Hatsumi et al. |
| 2016/0274398 A1 | 9/2016 | Hirakata et al. |
| 2016/0282989 A1 | 9/2016 | Hirakata et al. |
| 2016/0282990 A1 | 9/2016 | Kimura et al. |
| 2016/0299601 A1 | 10/2016 | Yamazaki et al. |
| 2016/0328080 A1 | 11/2016 | Miyake |
| 2016/0349557 A1 | 12/2016 | Shishido et al. |
| 2016/0349558 A1 | 12/2016 | Shishido et al. |
| 2016/0351552 A1 | 12/2016 | Takahashi et al. |
| 2017/0010712 A1 | 1/2017 | Yoshizumi et al. |
| 2017/0017340 A1 | 1/2017 | Liu et al. |
| 2017/0075475 A1 | 3/2017 | Miyake |
| 2017/0205913 A1 | 7/2017 | Kimura et al. |
| 2017/0262107 A1 | 9/2017 | Kimura et al. |
| 2019/0288013 A1 | 9/2019 | Yamazaki |
| 2020/0142514 A1 | 5/2020 | Hwang et al. |
| 2020/0174603 A1 | 6/2020 | Kurasawa et al. |

FOREIGN PATENT DOCUMENTS

| | | |
|---|---|---|
| CN | 101266348 A | 9/2008 |
| CN | 101893955 A | 11/2010 |
| CN | 102171630 A | 8/2011 |
| CN | 102262478 A | 11/2011 |
| CN | 102301409 A | 12/2011 |
| CN | 102455536 A | 5/2012 |
| CN | 102667691 A | 9/2012 |
| CN | 102667910 A | 9/2012 |
| CN | 103309072 A | 9/2013 |
| CN | 103529576 A | 1/2014 |
| CN | 103577017 A | 2/2014 |
| CN | 104007870 A | 8/2014 |
| CN | 104020602 A | 9/2014 |
| CN | 104657012 A | 5/2015 |
| CN | 106125971 A | 11/2016 |
| EP | 1380879 A | 1/2004 |
| EP | 2096526 A | 9/2009 |
| EP | 2447814 A | 5/2012 |
| EP | 2873999 A | 5/2015 |
| EP | 2960759 A | 12/2015 |
| JP | 2009-205321 A | 9/2009 |
| JP | 2009-244958 A | 10/2009 |
| JP | 2010-267222 A | 11/2010 |
| JP | 2011-197685 A | 10/2011 |
| JP | 2012-043219 A | 3/2012 |
| JP | 2013-178738 A | 9/2013 |
| JP | 2013-191015 A | 9/2013 |
| JP | 2013-242432 A | 12/2013 |
| JP | 2014-048605 A | 3/2014 |
| JP | 2015-072549 A | 4/2015 |
| JP | 2015-225649 A | 12/2015 |
| JP | 2016-004183 A | 1/2016 |
| JP | 2016-110643 A | 6/2016 |
| KR | 2009-0092695 A | 9/2009 |
| KR | 2014-0019750 A | 2/2014 |
| KR | 2016-0044414 A | 4/2016 |
| WO | WO-2008/010350 | 1/2008 |
| WO | WO-2010/014783 | 2/2010 |
| WO | WO-2011/074391 | 6/2011 |
| WO | WO-2011/084261 | 7/2011 |
| WO | WO-2014/038160 | 3/2014 |

OTHER PUBLICATIONS

Chinese Office Action (Application No. 201710545808.1) Dated Mar. 18, 2022.
Chinese Office Action (Application No. 201710545808.1) Dated Jun. 29, 2022.

* cited by examiner

When no in contact

Input voltage waveform

Output current waveform

When in contact

Input voltage waveform

Output current waveform

3510

3511

3531   3533   3532      3536    3534   3535

3543      3541

700

751H
770P
770D

AF2
AF1

FPC1
ACF1

FPC1
ACF1

CP

751H

C(g)

M(h)

722

521

528

505

570

519B
591B
511B

MD    501C

520

522    M

550(i,j)

551(i,j)
553(j)
552

702(i,j)

GD

X1    X2 X3    X4 X5    X6 X7

SW1,M,MD

508

508A  508C  508B    501C 512A    512B

516

504    506    518

INPUT/OUTPUT PANEL, INPUT/OUTPUT DEVICE, AND SEMICONDUCTOR DEVICE

CROSS-REFERENCE TO RELATED APPLICATIONS

This application is a continuation of U.S. application Ser. No. 18/673,733, filed May 24, 2024, now allowed, which is a continuation of U.S. application Ser. No. 18/312,104, filed May 4, 2023, now U.S. Pat. No. 12,008,185, which is a continuation of U.S. application Ser. No. 17/751,782, filed May 24, 2022, now U.S. Pat. No. 11,675,452, which is a continuation of U.S. application Ser. No. 16/208,638, filed Dec. 4, 2018, now U.S. Pat. No. 11,372,488, which is a continuation of U.S. application Ser. No. 15/645,019, filed Jul. 10, 2017, now U.S. Pat. No. 10,152,160, which claims the benefit of a foreign priority application filed in Japan as Serial No. 2016-138237 on Jul. 13, 2016, all of which are incorporated by reference.

BACKGROUND OF THE INVENTION

1. Field of the Invention

One embodiment of the present invention relates to an input/output panel, an input/output device, or a semiconductor device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, an input/output device, a light-emitting device, a power storage device, a memory device, a method for driving any of them, and a method for manufacturing any of them.

2. Description of the Related Art

A structure in which a common electrode that is for display and originally arranged for each liquid crystal display element is used as one electrode (drive electrode) of a pair of touch sensor electrodes, and the other electrode (detection electrode for a sensor) is newly formed, has been known. In addition, a structure in which a common driving signal existing as a driving signal for display is also used as a driving signal for a touch sensor is known (Patent Document 1).

Touch sensing circuits in which circuit elements, such as touch signal lines (e.g., as drive lines and sense lines) and grounding regions, in display pixel stackups are grouped together, and which sense a touch on or near the display are known (Patent Document 2).

REFERENCE

Patent Document

[Patent Document 1] Japanese Published Patent Application No. 2009-244958
[Patent Document 2] Japanese Published Patent Application No. 2011-197685

SUMMARY OF THE INVENTION

An object of one embodiment of the present invention is to provide a novel input/output panel having high convenience or reliability. Another object is to provide a novel input/output device having high convenience or reliability. Another object is to provide a novel input/output panel, a novel input/output device, or a novel semiconductor device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

An input/output device of one embodiment of the present invention includes a first sensor electrode, a second sensor electrode, a layer containing a liquid crystal material, a substrate, a first electrode, a second electrode, and a sensor circuit. The layer containing a liquid crystal material has a region overlapping with the first sensor electrode. The substrate has a region sandwiched between the first sensor electrode and the layer containing a liquid crystal material. The second sensor electrode has a region overlapping with the substrate with the layer containing a liquid crystal material sandwiched therebetween. The second sensor electrode is positioned so that capacitance is generated between the first sensor electrode and the second sensor electrode. The first electrode has a region overlapping with the substrate with the layer containing a liquid crystal material sandwiched therebetween. The first electrode contains a material the same as a material of the second senor electrode. The layer containing a liquid crystal material contains a liquid crystal material. The second electrode is positioned so that an electric field for controlling alignment of the liquid crystal material is applied between the first electrode and the second electrode. The sensor circuit can sense a change in capacitance.

An input/output device of one embodiment of the present invention includes a first sensor electrode, a second sensor electrode, a layer containing a light-emitting material, a substrate, a first electrode, a second electrode, and a sensor circuit. One of surfaces of the substrate has a region where the first sensor electrode is formed. Another surface of the substrate has a region where the second electrode is formed. A region including the first electrode is sandwiched between the second electrode and the substrate. A region including the layer containing a light-emitting material is sandwiched between the second electrode and the first electrode. The first electrode contains a material the same as a material of the second sensor electrode. The second sensor electrode is positioned so that capacitance is generated between the first sensor electrode and the second sensor electrode. The sensor circuit can sense a change in capacitance.

The first sensor electrode is positioned so that the substrate is located between the first sensor electrode and a display element. The first sensor electrode is also referred to as a sensor electrode simply in this specification. The second sensor electrode is positioned so that the substrate is not located between the second sensor electrode and the display element. The second sensor electrode is also referred to as an in-cell sensor electrode, simply in this specification.

In such a structure, the in-cell sensor electrode is not electrically connected to a wiring that is connected to the display element in an input/output panel. Thus, a highly reliable or operable input/output device in which a noise occurring at writing image data to a pixel is independent of a reduction in the sensitivity of a sensor can be formed.

Furthermore, in each of the above structures, a third sensor electrode is preferably provided on a plane where the sensor electrode is provided. Furthermore, in each of the above structures, the third sensor electrode is preferably provided to overlap with the in-cell sensor electrode. Furthermore, in each of the above structures, a floating potential is preferably supplied to the third sensor electrode. Note that in this specification, the third sensor electrode is also referred to as a sub-sensor electrode.

Furthermore, in each of the above structures, the layer containing a light-emitting material and the layer containing a liquid crystal material are preferably provided to overlap with each other.

Furthermore, in each of the above structures, a backlight is provided, each of the first electrode and the second electrode preferably has a reflectance greater than or equal to 5% and less than 100% and a transmittance greater than or equal to 1% and less than 95% with respect to light whose wavelength range is greater than or equal to 400 nm and less than 800 nm, and light of the backlight is preferably capable of entering the layer containing a liquid crystal material.

A semiconductor device of another embodiment of the present invention includes one or more of a keyboard, a hardware button, a pointing device, a touch sensor, an illuminance sensor, an imaging device, an audio input device, a viewpoint input device, and a pose detection device; and the above-described input/output device.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, although connection relation of the transistor is described assuming that the source and the drain are fixed for convenience in some cases, actually, the names of the source and the drain interchange with each other depending on the relation of the potentials.

Note that in this specification, a "source" of a transistor means a source region that is part of a semiconductor film or a source electrode connected to the semiconductor film. Similarly, a "drain" of a transistor means a drain region that is part of the semiconductor film or a drain electrode connected to the semiconductor film. A "gate" means a gate electrode.

Note that in this specification, a state in which transistors are connected to each other in series means, for example, a state in which only one of a source and a drain of a first transistor is connected to only one of a source and a drain of a second transistor. In addition, a state in which transistors are connected in parallel to each other means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, connection means not only direct connection but also indirect connection through a circuit element such as a wiring, a resistor, a diode, or a transistor so that current, a potential, or voltage can be supplied or transmitted.

In this specification, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

Furthermore, in this specification, one of a first electrode and a second electrode of a transistor refers to a source electrode and the other refers to a drain electrode.

One embodiment of the present invention can provide a novel input/output panel having high convenience or reliability. According to another embodiment of the present invention, a novel input/output device having high convenience or reliability can be provided. According to another embodiment of the present invention, a novel input/output panel, a novel input/output device, or a novel semiconductor device can be provided.

Note that the description of these effects does not preclude the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIG. 17 is a block diagram illustrating a structure of an input/output device of one embodiment.

DETAILED DESCRIPTION OF THE INVENTION

Figures 1A, 1B:
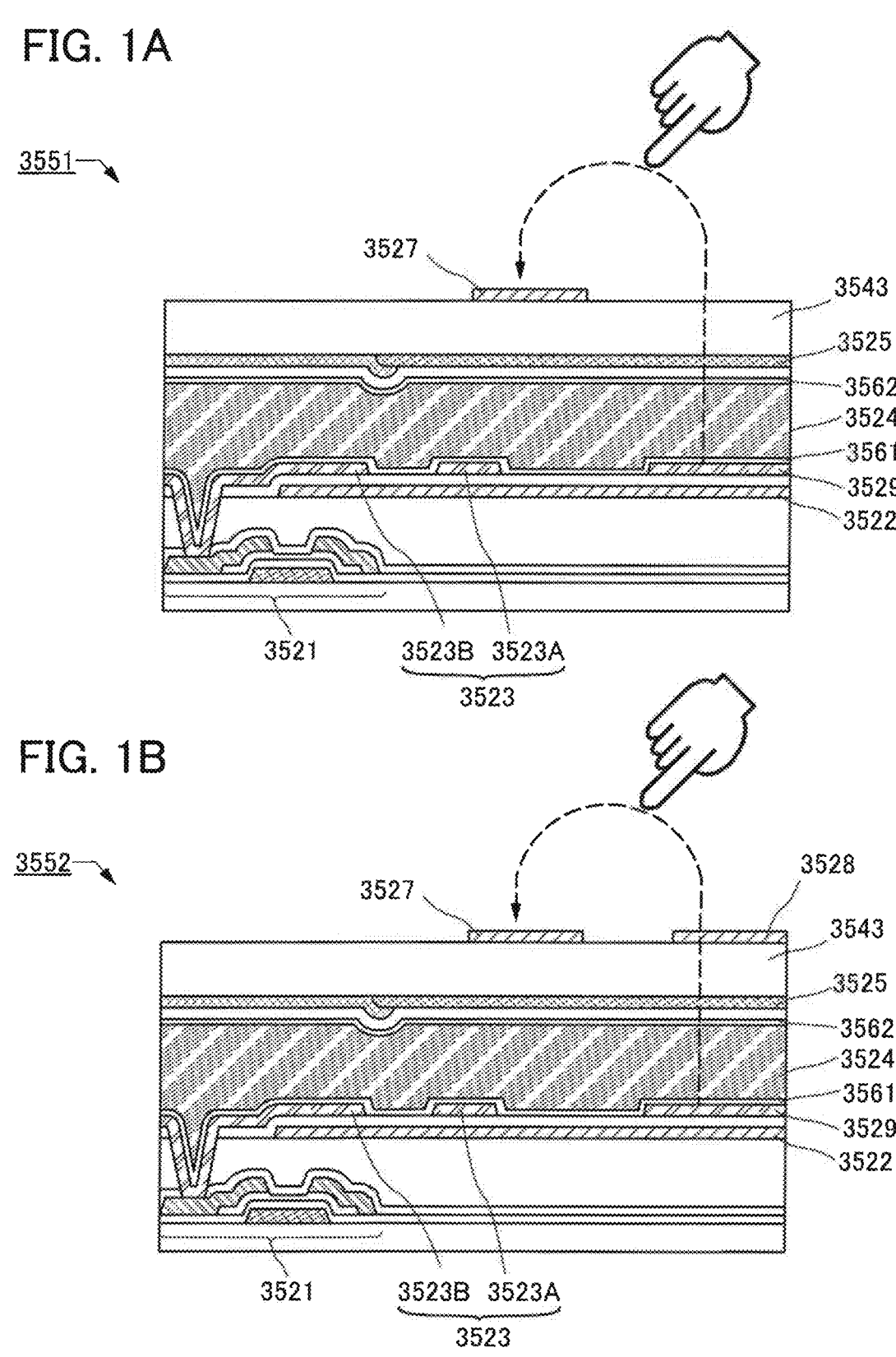
FIGS. 1A and 1B are each a cross-sectional view illustrating a structure of a pixel that can be used in an input/output device of one embodiment.

Embodiments will be described in detail with reference to the drawings. Note that the present invention is not limited to the following description and it will be readily appreciated by those skilled in the art that modes and details can be modified in various ways without departing from the spirit and the scope of the present invention. Thus, the present invention should not be construed as being limited to the description in the following embodiments and example.

Note that in the structures of the present invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as "first," "second," and the like are used in order to avoid confusion among components and do not limit the number.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in an active layer of a transistor is called an oxide semiconductor in some cases. That is to say, a metal oxide that has at least one of an amplifying function, a rectifying function, and a switching function can be called a metal oxide semiconductor, or OS for short. In addition, an OS FET is a transistor including a metal oxide or an oxide semiconductor.

In this specification and the like, a metal oxide containing nitrogen is also called a metal oxide in some cases. Moreover, a metal oxide containing nitrogen may be called a metal oxynitride.

In this specification and the like, "c-axis aligned crystal (CAAC)" or "cloud-aligned composite (CAC)" might be stated. CAAC refers to an example of a crystal structure, and CAC refers to an example of a function or a material composition.

In this specification and the like, a CAC-OS or a CAC metal oxide has a conducting function in a part of the material and has an insulating function in another part of the material; as a whole, the CAC-OS or the CAC metal oxide has a function of a semiconductor. In the case where the CAC-OS or the CAC metal oxide is used in an active layer of a transistor, the conducting function is to allow electrons (or holes) serving as carriers to flow, and the insulating function is to not allow electrons serving as carriers to flow. By the complementary action of the conducting function and the insulating function, the CAC-OS or the CAC metal oxide can have a switching function (on/off function). In the CAC-OS or CAC-metal oxide, separation of the functions can maximize each function.

In this specification and the like, the CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. The conductive regions are observed to be coupled in a cloud-like manner with their boundaries blurred, in some cases.

Furthermore, in the CAC-OS or the CAC metal oxide, the conductive regions and the insulating regions each have a size greater than or equal to 0.5 nm and less than or equal to 10 nm, preferably greater than or equal to 0.5 nm and less than or equal to 3 nm and are dispersed in the material, in some cases.

The CAC-OS or the CAC metal oxide includes components having different bandgaps. For example, the CAC-OS or the CAC metal oxide includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or the CAC metal oxide is used in a channel region of a transistor, high current drive capability in the on state of the transistor, that is, high on-state current and high field-effect mobility, can be obtained.

In other words, CAC-OS or CAC-metal oxide can be called a matrix composite or a metal matrix composite.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments and example. Note that in structures of the present invention described below, the same portions or portions having similar functions are denoted by the same reference numerals in different drawings, and a description thereof is not repeated.

Embodiment 1

In this embodiment, an input/output panel that can be used in an input/output device of one embodiment of the present invention will be described. In particular, a structural example of a sensor that can sense proximity or touch of an object (the sensor is also referred to as a touch sensor) and can be applied to the above input/output panel will be described.

A capacitive touch sensor is used as the touch sensor of one embodiment of the present invention. Examples of the capacitive touch sensor are typically of a surface capacitive type, a projected capacitive type, and the like. Further, examples of the projected capacitive type are of a self capacitive type, a mutual capacitive type, and the like mainly in accordance with the difference in the driving method. Here, the use of a mutual capacitive type is preferable because of simultaneous sensing of multiple points (also referred to as multipoint sensing or multi-touch).

[Arrangement of Electrode Used for Touch Sensor]

The touch sensor of one embodiment of the present invention includes two or three electrodes. Capacitance is generated between the two or three electrodes. The arrangement of the electrodes is described below with use of input/output panels 3551 and 3552 (see FIGS. 1A and 1B) as examples.

FIG. 1A is a schematic cross-sectional view of part of a pixel of the input/output panel 3551. FIG. 1B is a schematic cross-sectional view of part of a pixel of the input/output panel 3552. Each of the input/output panel 3551 and the input/output panel 3552 includes a liquid crystal element including a layer containing a liquid crystal material and having a fringe field switching (FFS) mode.

Each of the input/output panel 3551 and the input/output panel 3552 includes a transistor 3521, an electrode 3522, an electrode 3523, a layer 3524 containing a liquid crystal material, and a color filter 3525. The layer 3524 containing a liquid crystal material is sandwiched between an alignment film 3561 and an alignment film 3562. The electrode 3523 is electrically connected to one of a source and a drain of the transistor 3521. Furthermore, an insulating layer is sandwiched between the electrode 3523 and the electrode 3522. The electrode 3523 and the electrode 3522 can each function as one electrode of the liquid crystal element, and by applying voltage therebetween, alignment of liquid crystals can be controlled.

Both an electrode 3523A and an electrode 3523B illustrated in FIG. 1A are part of the electrode 3523, and the electrode 3523 has a comb-like shape. The comb-like electrode shape is applicable to an input/output panel including a liquid crystal element having an FFS mode in another embodiment.

Each of the input/output panel 3551 and the input/output panel 3552 includes a first substrate 3541 and a second substrate 3543. The layer 3524 containing a liquid crystal material is provided between the first substrate 3541 and the second substrate 3543. Furthermore, a sensor electrode 3527 is positioned so that the second substrate 3543 is located between the sensor electrode 3527 and the layer 3524 containing a liquid crystal material.

The touch sensor in the input/output panel 3551 performs capacitive sensing by sensing a change in capacitance of a capacitor including the sensor electrode 3527 and an in-cell sensor electrode 3529 as a pair of electrodes. In the input/ output panel 3551, the second substrate 3543 is provided between the sensor electrode 3527 and the in-cell sensor electrode 3529. The in-cell sensor electrode 3529 is formed concurrently with the electrode 3523 using the same material.

In contrast, the touch sensor in the input/output panel 3552 includes a sub-sensor electrode 3528 to which a floating potential is applied. The sub-sensor electrode 3528 to which a floating potential is applied has a region overlapping with the in-cell sensor electrode 3529 in a thickness direction of the substrate. A change in capacitance of a capacitor formed between the sensor electrode 3527 and the sub-sensor electrode 3528 is sensed, whereby capacitive sensing is performed.

Although not illustrated in FIGS. 1A and 1B, a sensor circuit is provided in the touch sensor of one embodiment of the present invention. The sensor circuit is electrically connected to the sensor electrode 3527. An oscillation circuit is electrically connected to the in-cell sensor electrode 3529, and a potential changes over time. A change in the potential of the sensor electrode 3527 depends on a change in capacitance of the capacitor formed between the sensor electrode 3527 and the in-cell sensor electrode 3529. In the case where the sub-sensor electrode 3528 is formed, a change in the potential of the sensor electrode 3527 depends on a change in capacitance of the capacitor formed between the sensor electrode 3527 and the sub-sensor electrode 3528. The approach of an object to the touch sensor causes a change in capacitance described above.

The sensor circuit senses a change in the potential of the sensor electrode 3527, thereby sensing a change in the capacitance.

When the sub-sensor electrode 3528 to which a floating potential is applied is provided as in the input/output panel 3552, the object passes across a line of electric force generated between the sensor electrode 3527 and the sub-sensor electrode 3528. The more lines of electric force each generated between a pair of electrodes the object passes across, the more capacitance generated between the electrodes is reduced. In the input/output panel 3551, the object passes across a line of electric force generated between the sensor electrode 3527 and the in-cell sensor electrode 3529. On the other hand, in the input/output panel 3552, the object passes across more lines of electric force than the case of the input/output panel 3551. Thus, the input/output panel 3552 has higher sensitivity of the touch sensor than the input/output panel 3551.

Furthermore, the sub-sensor electrode 3528 to which a floating potential is applied is provided for the second substrate 3543, whereby the influence of static electricity to which the touch sensor is exposed can be reduced in some cases.

Moreover, a pattern on the input/output panel with the sub-sensor electrode 3528 to which a floating potential is applied is uniform. That is, a linear pattern is unlike to be seen.

Thus, an input/output panel whose display quality is improved is obtained. [Example of sensing method of sensor]

Figure 2A:
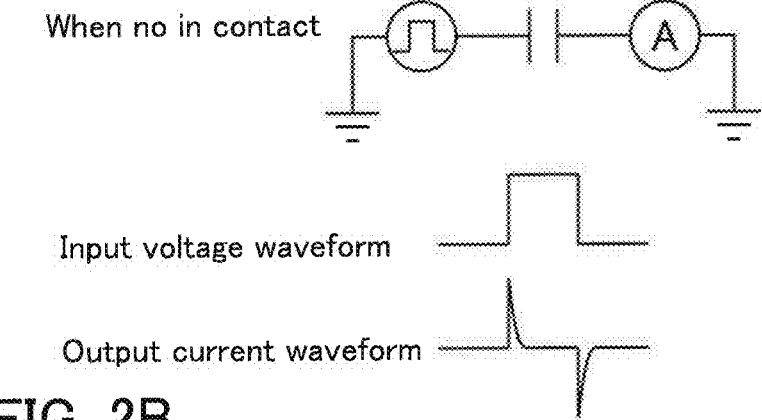
FIGS. 2A and 2B are schematic views illustrating a mutual capacitive touch sensor and input and output waveforms.
Figure 2B:
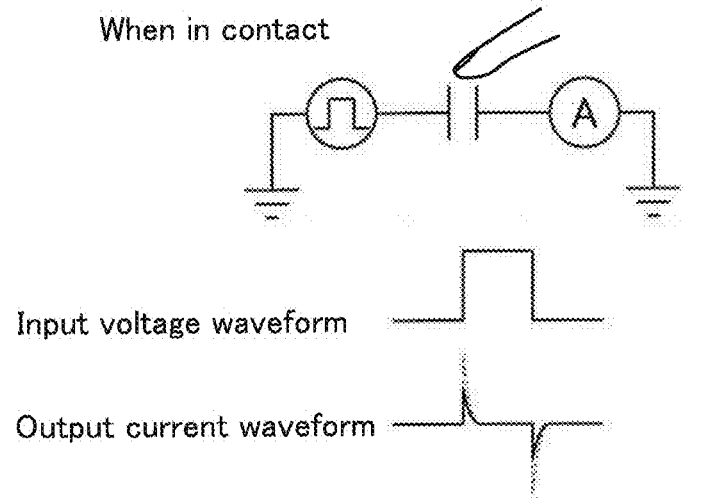

FIGS. 2A and 2B are schematic views each illustrating a structure of a mutual capacitive touch sensor and input and output waveforms. The touch sensor includes a pair of electrodes. A capacitance is generated between the pair of electrodes. Input voltage is input to one of the pair of electrodes. Further, a sensor circuit which senses current flowing in the other electrode (or a potential of the other electrode) is provided.

For example, in the case where a rectangular wave is used as an input voltage waveform as illustrated in FIG. 2A, a waveform having a sharp peak is detected as an output current waveform.

Further, in the case where an object having conductivity is proximate to or touches a capacitor as illustrated in FIG. 2B, the capacitance value between the electrodes is decreased; accordingly, the current value of the output is decreased with a decrease in the capacitance value.

By sensing a change in capacitance by using a change in output current (or potential) with respect to input voltage in this manner, proximity or a touch of an object can be sensed.

[Structural Example of Touch Sensor]

Figure 2C:
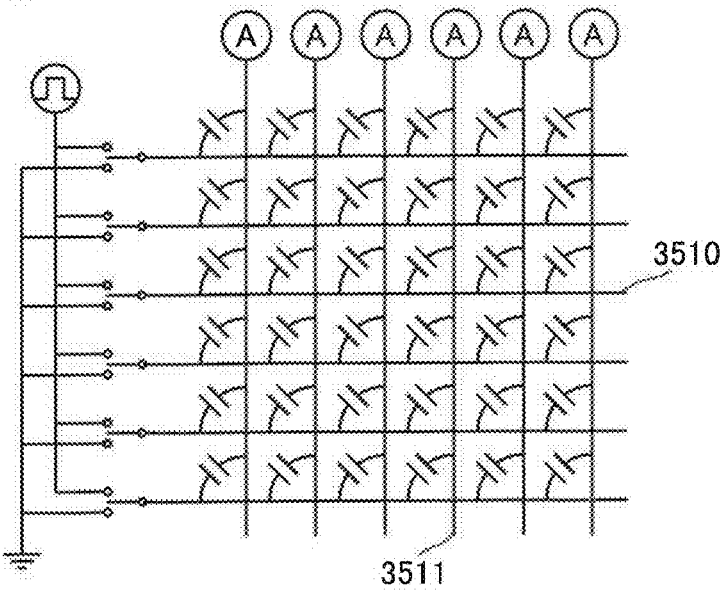
FIG. 2C illustrates a structure example of a touch sensor provided with a plurality of capacitors arranged in a matrix.

FIG. 2C illustrates a structure example of a touch sensor provided with a plurality of capacitors arranged in a matrix.

The touch sensor includes a plurality of wirings 3510 extending in an X direction (the horizontal direction of this figure) and a plurality of wirings 3511 extending in a Y direction (the vertical direction of this figure) which intersect with the plurality of wirings. Capacitance is generated between two wirings intersecting with each other.

One of input voltage and a common potential (including a grounded potential and a reference potential) is input to the wiring extending in the X direction. Furthermore, a sensor circuit (e.g., a source meter or a sense amplifier) is electrically connected to the wirings extending in the Y direction and can sense current (or potential) flowing through the wirings.

The touch sensor can perform sensing two dimensionally in such a manner that the touch sensor sequentially scans the plurality of wirings extending in the X direction so that input voltage is input and senses a change in current (or potential) flowing through the wirings extending in the Y direction.

[Structure Example of Input/Output Panel]

A structure example of an input/output panel including a touch sensor and a display portion including a plurality of pixels and a case where the input/output panel is incorporated in an electronic device are described below.

Figure 3A:
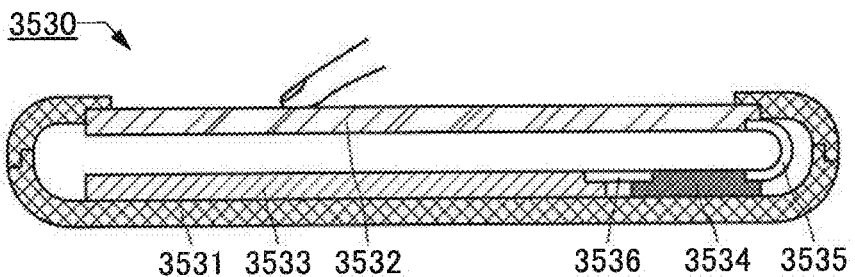
FIGS. 3A and 3B each illustrate an electronic device including an input/output panel according to one embodiment.

FIG. 3A is a schematic cross-sectional view of an electronic device including an input/output panel.

An electronic device 3530 includes a housing 3531 and at least an input/output panel 3532, a battery 3533, and a control portion 3534, which are provided in the housing 3531. The input/output panel 3532 is electrically connected to the control portion 3534 through a wiring 3535. The control portion 3534 controls displaying an image on a display portion and the sensing operation of the touch sensor. The battery 3533 is electrically connected to the control portion 3534 through a wiring 3536 to supply electric power to the control portion 3534.

The input/output panel 3532 is provided so that its surface is exposed. An image can be displayed on the exposed surface of the input/output panel 3532 and the proximity or the contact of an object can be sensed.

Figure 3B:
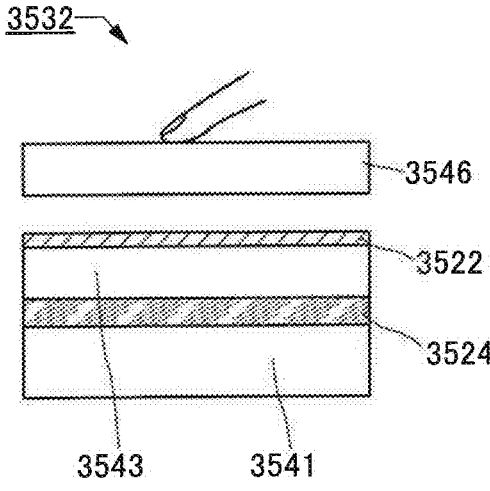

The input/output panel 3532 in FIG. 3B is provided with a protective substrate 3546 so that the electrode 3522 is positioned between the protective substrate 3546 and the second substrate 3543. The protective substrate 3546 and the sensor electrode 3527 may be in contact with each other or bonded to each other with an adhesive.

An object comes in contact with or close to one of the surfaces of the protective substrate 3546; thus, the mechanical strength of at least the surface is preferably high. For example, a tempered glass which has been subjected to physical or chemical treatment by an ion exchange method, a thermal tempering method, or the like and has a surface to which compressive stress has been applied can be used as the protective substrate 3546. Alternatively, a flexible substrate with a coated surface, such as a plastic substrate, can be used. Note that a protective film or an optical film may be provided over the protective substrate 3546.

In the input/output panel 3551 and the input/output panel 3552 illustrated in FIGS. 1A and 1B, the in-cell sensor electrode 3529 is electrically connected to the wiring 3510, and the sensor electrode 3527 is connected to the wiring 3511. Note that the in-cell sensor electrode 3529 may be electrically connected to the wiring 3511, and the sensor electrode 3527 may be connected to the wiring 3510. This relation can be applied to another embodiment.

In the input/output panel of one embodiment of the present invention, a wiring through which a signal for writing an image is transmitted and a wiring through which data sensed by the touch sensor is transmitted are not electrically connected. In other words, it is not necessary to separately provide a period in which an image is written and a period in which sensing is performed by the touch sensor. Thus, a highly reliable or operable input/output device in which a noise occurring at writing image data to a pixel is independent of a reduction in the sensitivity of the touch sensor can be formed Embodiment 2

In this embodiment, a structure example of a pixel that can be used in an input/output panel of one embodiment of the present invention, which is different from that in the input/output panel 3551, will be described. Note that a change in capacitance between a pair of electrode is sensed, so that capacitive sensing is performed.

Figure 4A:
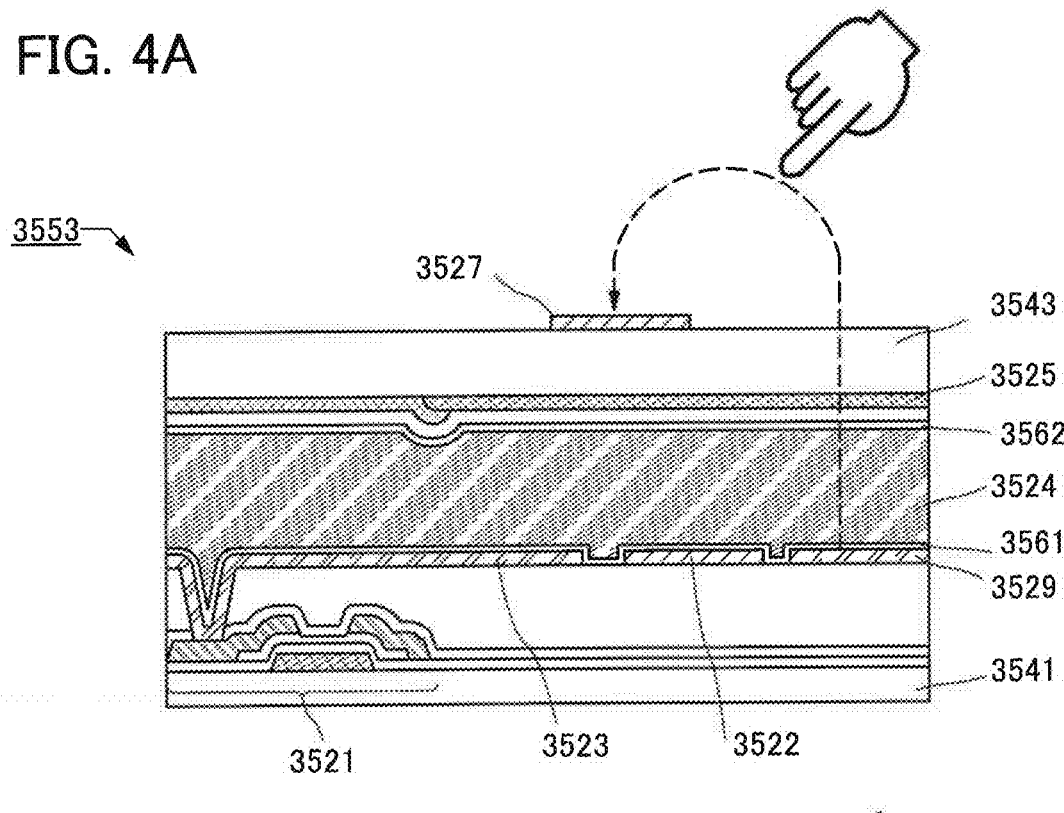
FIGS. 4A and 4B are cross-sectional views each illustrating a structure of a pixel that can be used in an input/output device of one embodiment.

FIG. 4A is a schematic cross-sectional view illustrating part of a pixel of an input/output panel 3553 including a liquid crystal element having an in-plane-switching (IPS) mode.

The pixel includes the transistor 3521, the electrode 3522, the electrode 3523, the layer 3524 containing a liquid crystal material, and the color filter 3525. The layer 3524 containing a liquid crystal material is sandwiched between the alignment film 3561 and the alignment film 3562. The electrode 3523 is electrically connected to one of a source and a drain of the transistor 3521. The electrode 3522 is connected to a wiring to which a common potential is applied. The electrode 3523 and the electrode 3522 can each function as one electrode of a liquid crystal element, and by applying voltage therebetween, alignment of liquid crystals can be controlled. The electrode 3523 and electrode 3522 provided in the pixel each have a comb-like shape and are provided on the same plane so as to engage with each other and be apart from each other.

In the input/output panel 3553, the sensor electrode 3527 and the in-cell sensor electrode 3529 serve as a pair of electrodes, and a change in capacitance is sensed, so that capacitive sensing is performed. The in-cell sensor electrode 3529 is formed concurrently with the electrode 3523 using the same material. For example, the in-cell sensor electrode 3529 is electrically connected to the above-described wiring 3510 or wiring 3511; thus, the pixel of the above-described input/output panel can be formed.

Figure 4B:
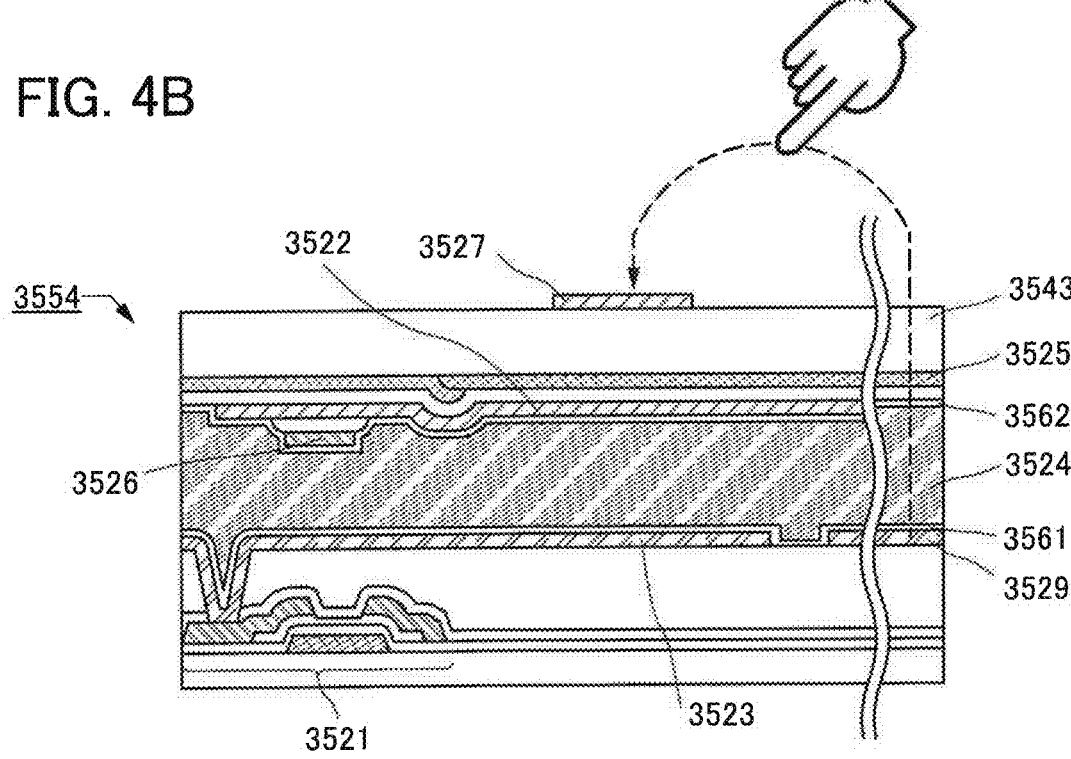

FIG. 4B is a cross-sectional schematic view illustrating part of a pixel of an input/output panel 3554 having a vertical alignment (VA) mode.

The layer 3524 containing a liquid crystal material is sandwiched between the electrode 3522 and the electrode 3523. Furthermore, a wiring 3526 is provided to overlap with the electrode 3522. For example, the wiring 3526 can be provided to electrically connect the block including the pixel illustrated in FIG. 4B and blocks different from the block including the pixel illustrated in FIG. 4B. The layer 3524 containing a liquid crystal material is positioned between the sensor electrode 3527 and the in-cell sensor electrode 3529. The in-cell sensor electrode 3529 is formed concurrently with the electrode 3523 using the same material.

In the input/output panel 3554, the sensor electrode 3527 and the in-cell sensor electrode 3529 serve as a pair of electrodes, and a change in capacitance is sensed, so that capacitive sensing is performed. The structure as a cross-sectional view illustrated in FIG. 4B spreads in the depth direction. The electrode 3522 has an opening at one region, and the electric field between the sensor electrode 3527 and the in-cell sensor electrode 3529 is not blocked.

Also, the input/output panel including a liquid crystal element with a twisted nematic (TN) mode can operate with the above-described arrangement of electrodes.

For example, the in-cell sensor electrode 3529 is electrically connected to the above-described wiring 3510 or wiring 3511; thus, the pixel of the above-described input/output panel can be formed.

Figure 5A:
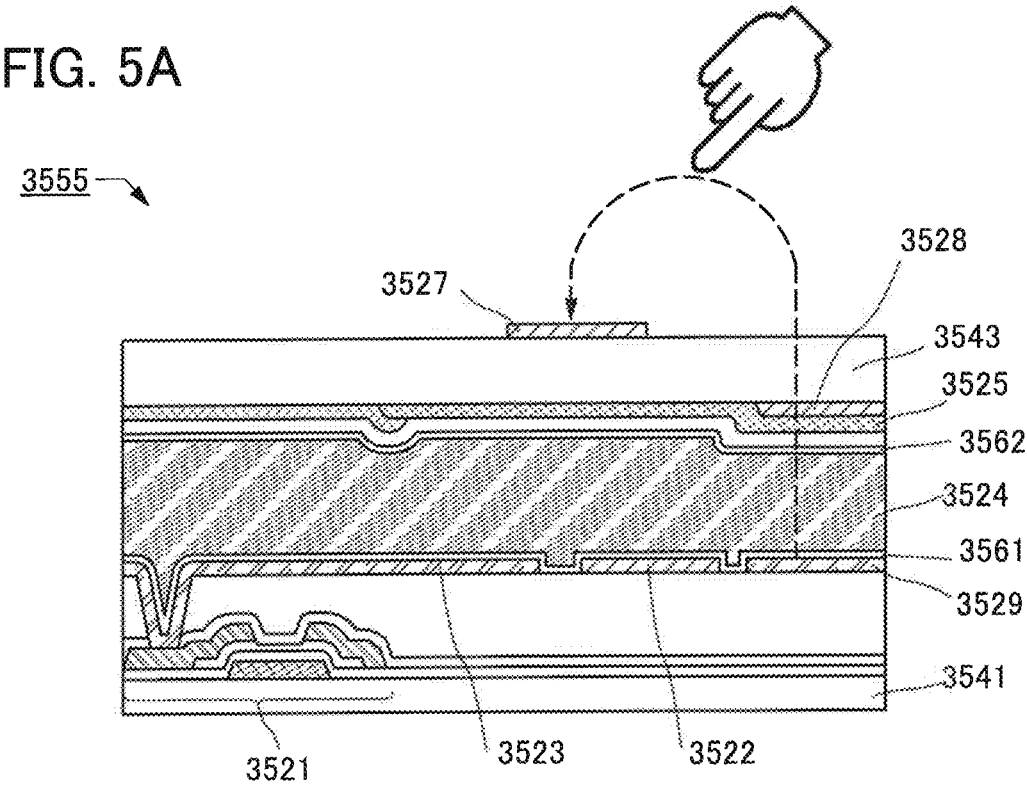
FIGS. 5A and 5B are cross-sectional views each illustrating a structure of a pixel that can be used in an input/output device of one embodiment.

FIG. 5A is a schematic cross-sectional view illustrating part of a pixel in an input/output panel 3555.

Like the input/output panel 3553, the input/output panel 3555 includes a liquid crystal having an IPS mode. A change in capacitance generated between the sensor electrode 3527 and the sub-sensor electrode 3528 is sensed, so that capacitive sensing is performed. Note that the sub-sensor electrode 3528 is arranged between the second substrate 3543 and the layer 3524 containing a liquid crystal material. The in-cell sensor electrode 3529 is formed concurrently with the electrode 3523 using the same material.

Figure 5B:
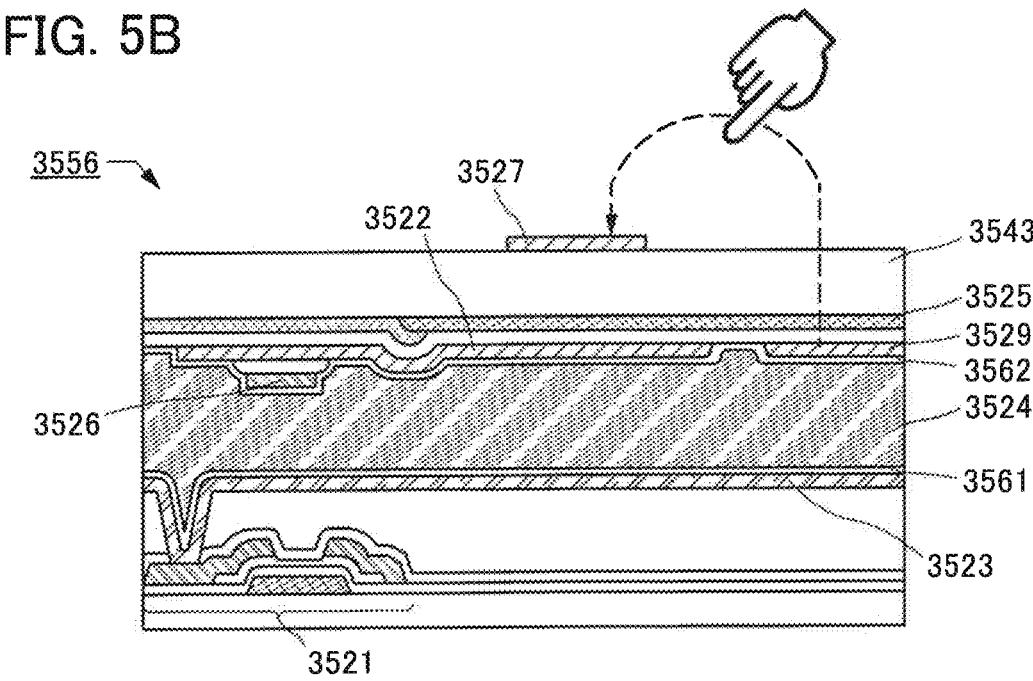

FIG. 5B is a schematic cross-sectional view illustrating part of a pixel in an input/output panel 3556. Like the input/output panel 3554, the input/output panel 3556 includes a liquid crystal element having a VA mode.

In the input/output panel 3556, the electrode 3523 is electrically connected to one of the source and the drain of the transistor 3521, and the electrode 3522 is connected to a wiring to which a common potential is applied. The sensor electrode 3527 and the in-cell sensor electrode 3529 serve as a pair of electrodes, and a change in capacitance is sensed, so that capacitive sensing is performed. The in-cell sensor electrode 3529 is formed concurrently with the electrode 3522 using the same material.

Figures 6A, 6B, 6C:
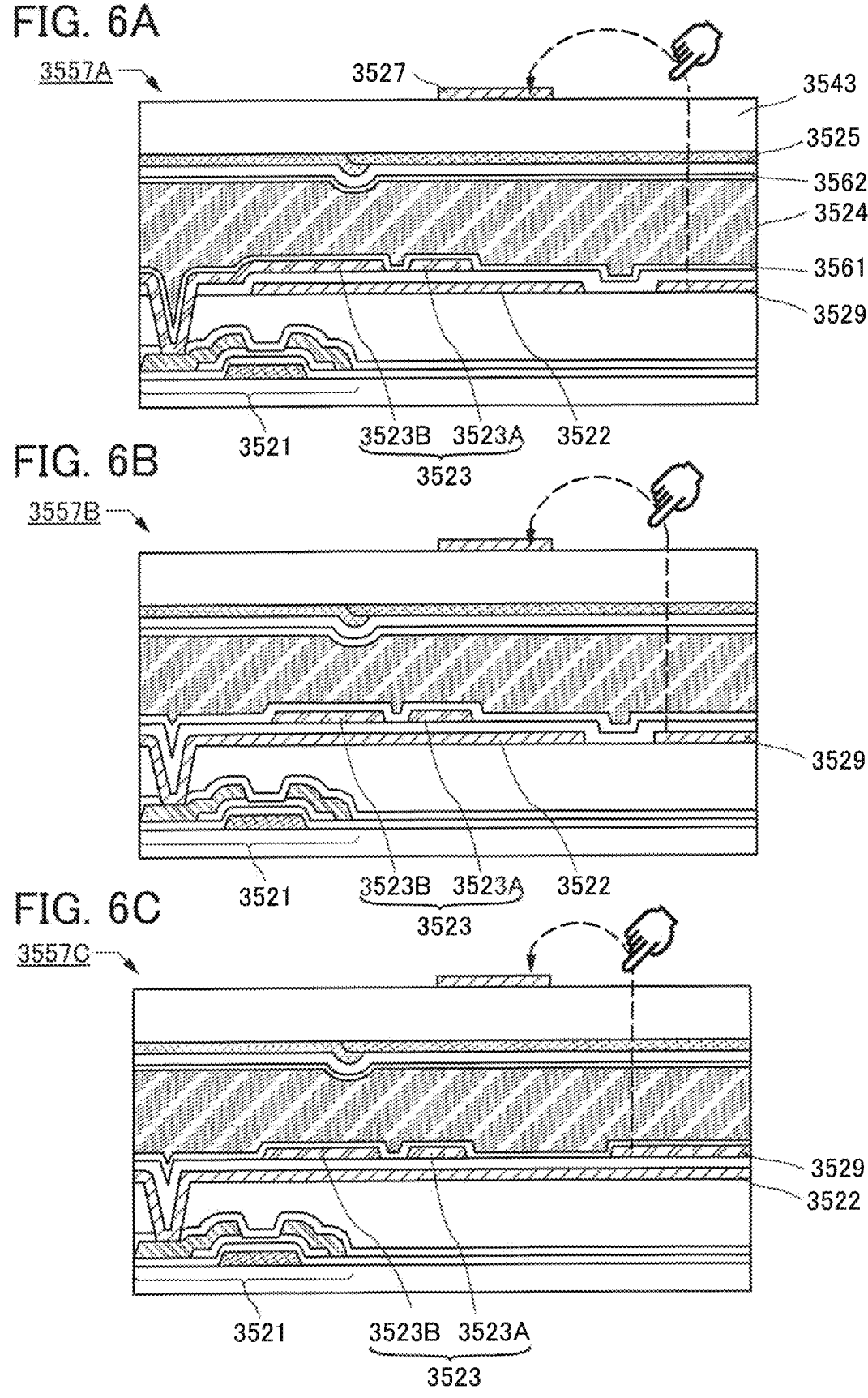
FIGS. 6A to 6C are cross-sectional views each illustrating a structure of a pixel that can be used in an input/output device of one embodiment.

Structures illustrated in FIGS. 6A to 6C each include a liquid crystal element having an FFS mode. In each of the structures, the sensor electrode 3527 and the in-cell sensor electrode 3529 serve as a pair of electrodes, and a change in capacitance is sensed, so that capacitive sensing can be performed. In FIGS. 6B and 6C, reference numerals the same as those in the other FFS structures are omitted.

FIG. 6A is a schematic cross-sectional view illustrating part of a pixel in an input/output panel 3557A. The in-cell sensor electrode 3529 is formed concurrently with the electrode 3522 using the same material. The electrode 3523 is electrically connected to one of the source and the drain of the transistor 3521. The electrode 3522 is electrically connected to a wiring to which a common potential is applied.

FIG. 6B is a schematic cross-sectional view illustrating part of a pixel in an input/output panel 3557B. The in-cell sensor electrode 3529 is formed concurrently with the electrode 3522 using the same material. The electrode 3522 is electrically connected to one of the source and the drain of the transistor 3521. The electrode 3523 is electrically connected to a wiring to which a common potential is applied.

FIG. 6C is a schematic cross-sectional view illustrating part of a pixel in an input/output panel 3557C. The in-cell sensor electrode 3529 is formed concurrently with the electrode 3523 using the same material. The electrode 3522 is electrically connected to one of the source and the drain of the transistor 3521. The electrode 3523 is electrically connected to a wiring to which a common potential is applied.

Moreover, the input/output panel of one embodiment of the present invention may include a light-emitting element.

Figure 7A:
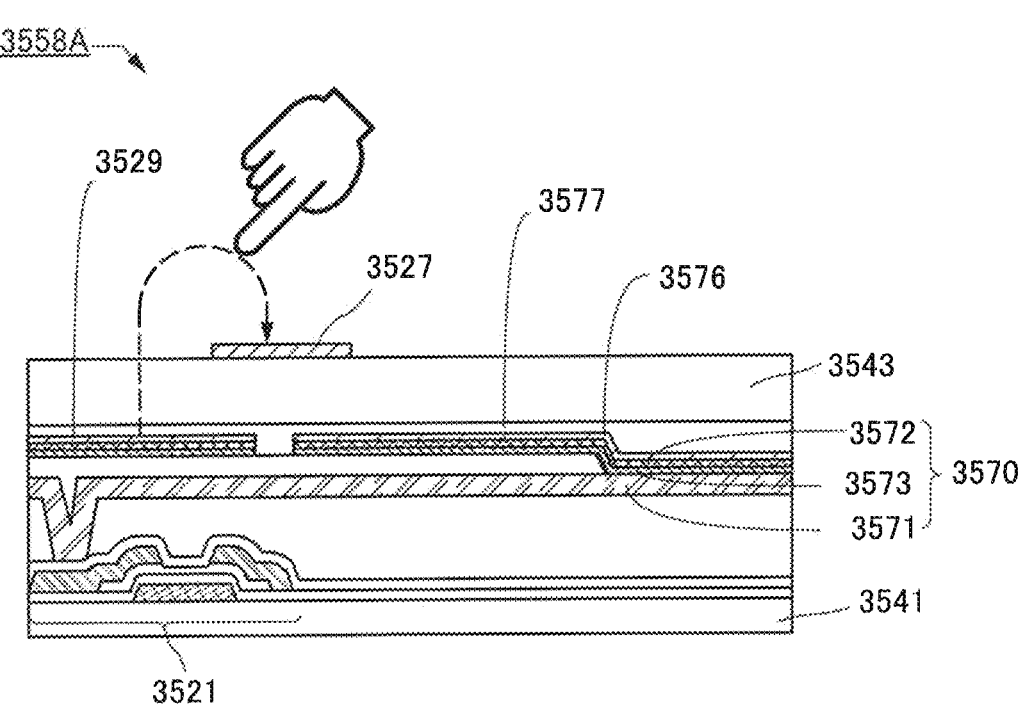
FIGS. 7A and 7B are cross-sectional views each illustrating a structure of a pixel that can be used in an input/output device of one embodiment.

FIG. 7A is a schematic cross-sectional view illustrating part of a pixel in an input/output panel 3558A. The input/output panel 3558A includes a light-emitting element 3570. The light-emitting element 3570 includes an electrode 3571, an electrode 3572, and a layer 3573 containing a light-emitting material between the electrode 3571 and the electrode 3572. One of the electrode 3571 and the electrode 3572, which is provided on a side where light emitted from the light-emitting element is seen, is formed using a conductive material transmitting visible light. For example, in the case where a light-emitting surface is provided on a side opposite to a side where a circuit including a transistor is formed, a conductive material transmitting visible light is used for a cathode of the light-emitting element.

The electrode 3571 can have a single-layer structure or a stacked-layer structure including any of metals such as aluminum, titanium, chromium, nickel, copper, yttrium, zirconium, molybdenum, silver, tantalum, and tungsten or an alloy containing any of these metals as its main component.

The electrode 3572 can be formed using a material transmitting visible light.

Specifically, a conductive oxide, such as indium oxide, indium tin oxide, indium zinc oxide, zinc oxide, or zinc oxide to which gallium is added, can be used. The above material may be used for the electrode 3571. The in-cell sensor electrode 3529 is formed concurrently with the electrode 3572 using the same material, but the in-cell sensor electrode 3529 and the electrode 3572 are not electrically connected to each other.

The input/output panel 3558A includes an insulating layer 3576 and a bonding layer 3577. The insulating layer 3576 prevents diffusion of water from the bonding layer 3577 to the layer 3573 containing a light-emitting material, and the bonding layer 3577 is used to bond the first substrate 3541 and the second substrate 3543.

In the input/output panel 3558A, the electrode 3571 is electrically connected to one of the source and the drain of the transistor 3521. The sensor electrode 3527 and the in-cell sensor electrode 3529 serve as a pair of electrodes, and a change in capacitance is sensed, so that capacitive sensing is performed.

Figure 7B:
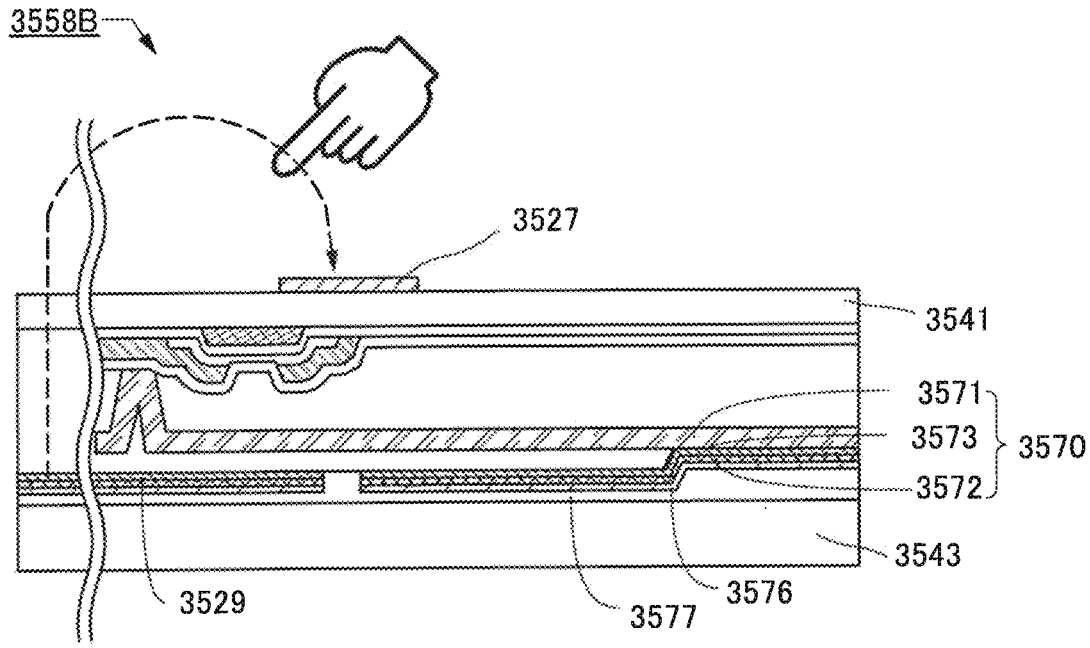

As in an input/output panel 3558B illustrated in FIG. 7B, the sensor electrode 3527 is provided so that the first substrate 3541 is located between the sensor electrode 3527 and the in-cell sensor electrode 3529, and a change in capacitance between the sensor electrode 3527 and the in-cell sensor electrode 3529 is sensed. In this manner, capacitive sensing may be performed. In this structure, light is emitted from the layer 3573 containing a light-emitting material toward the electrode 3571, and the electrode 3571 is formed using a conductive material transmitting visible light. The structure as a cross-sectional view in FIG. 7B spreads in the depth direction, and the electrode 3571 has an opening at one region. In other words, the structure has a region where the electric field between the sensor electrode 3527 and the in-cell sensor electrode 3529 is not blocked by a conductor such as the electrode 3571 or a conductive material electrically connected to the transistor 3521.

Figure 8A:
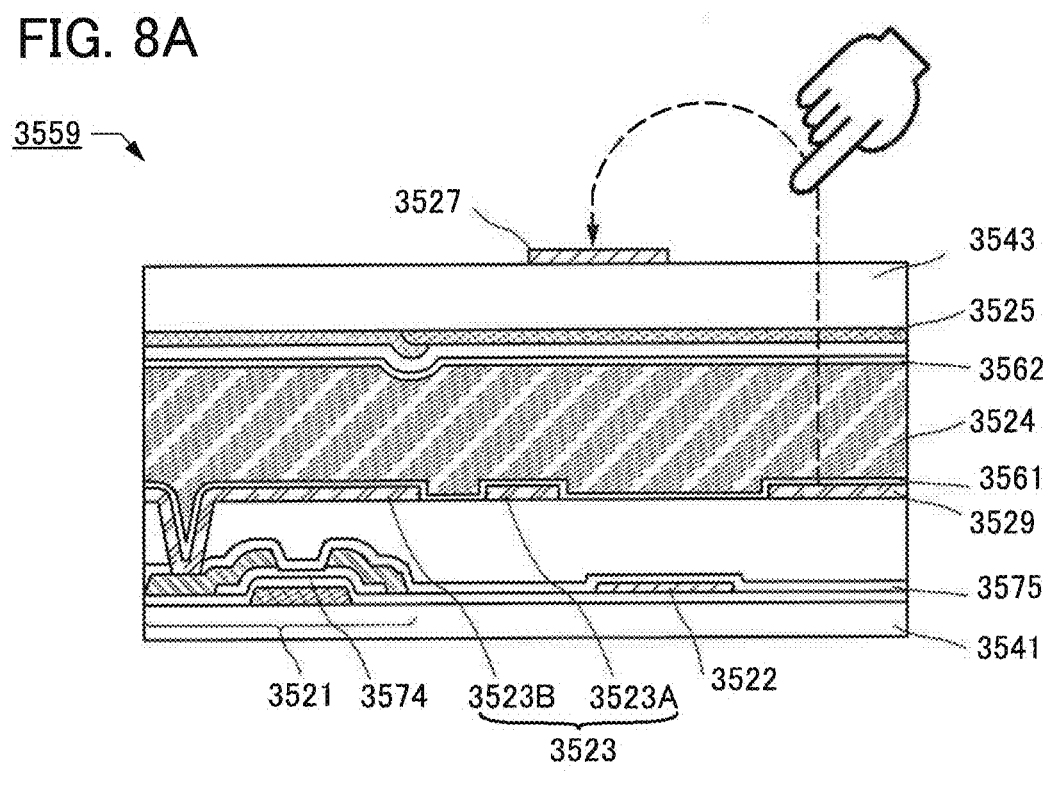
FIGS. 8A and 8B are cross-sectional views each illustrating a structure of a pixel that can be used in an input/output device of one embodiment.

An input/output panel 3559 illustrated in FIG. 8A includes a liquid crystal element having an FFS mode, like the input/output panel 3551 illustrated in FIG. 1A or the input/output panel 3556 illustrated in FIG. 5B. In the input/output panel 3559, the sensor electrode 3527 and the in-cell sensor electrode 3529 serve as a pair of electrodes, and a change in capacitance is sensed, so that capacitive sensing is performed.

The electrode 3522 included in the input/output panel 3559 is formed using a conductive film transmitting visible light. In other words, the electrode 3522 is formed using a conductive film whose reflectance is greater than or equal to 1%, preferably greater than or equal to 5% and less than 100% and whose light transmittance is greater than or equal to 1%, preferably greater than or equal to 10% and less than 100% with respect to light with a wavelength in a range greater than or equal to 400 nm and less than 800 nm.

For the electrode 3522, a conductive material containing silver (Ag) or aluminum (Al) and having a thickness of 1 nm to 30 nm, preferably 1 nm to 15 nm can be used.

Furthermore, for the electrode 3522, a material containing an element selected from indium, tin, zinc, gallium, and silicon can be used. Specifically, an In oxide, a Zn oxide, an In—Sn oxide (also referred to as ITO), an In—Sn—Si oxide (also referred to as ITSO), an In—Zn oxide, an In—Ga—Zn oxide, or the like can be used.

Furthermore, for the electrode 3522, a film containing graphene or graphite may be used. The film containing graphene can be formed in the following manner: a film containing graphene oxide is formed and is reduced. As a reducing method, a method with application of heat, a method using a reducing agent, or the like can be employed.

In the input/output panel 3559, the electrode 3522 is formed using a material the same as that of a semiconductor layer 3574, and an insulating film 3575 is formed thereover. In this structure, an oxide semiconductor typified by an In—Ga—Zn oxide may be used as a material of the electrode 3522 and the semiconductor layer 3574.

When the insulating film 3575 includes an nitride insulating film such as a silicon nitride film, the carrier density of the oxide semiconductor increases by supply of nitrogen or hydrogen from the insulating film 3575 by thermal diffusion. In other words, the oxide semiconductor functions as an oxide conductor (OC). Thus, the electrode 3522 can be used as an electrode.

In the case where the electrode 3522 is formed using an oxide conductor (OC), the thickness can be greater than or equal to 30 nm and less than or equal to 500 nm, or greater than or equal to 100 nm and less than or equal to 400 nm.

Figure 8B:
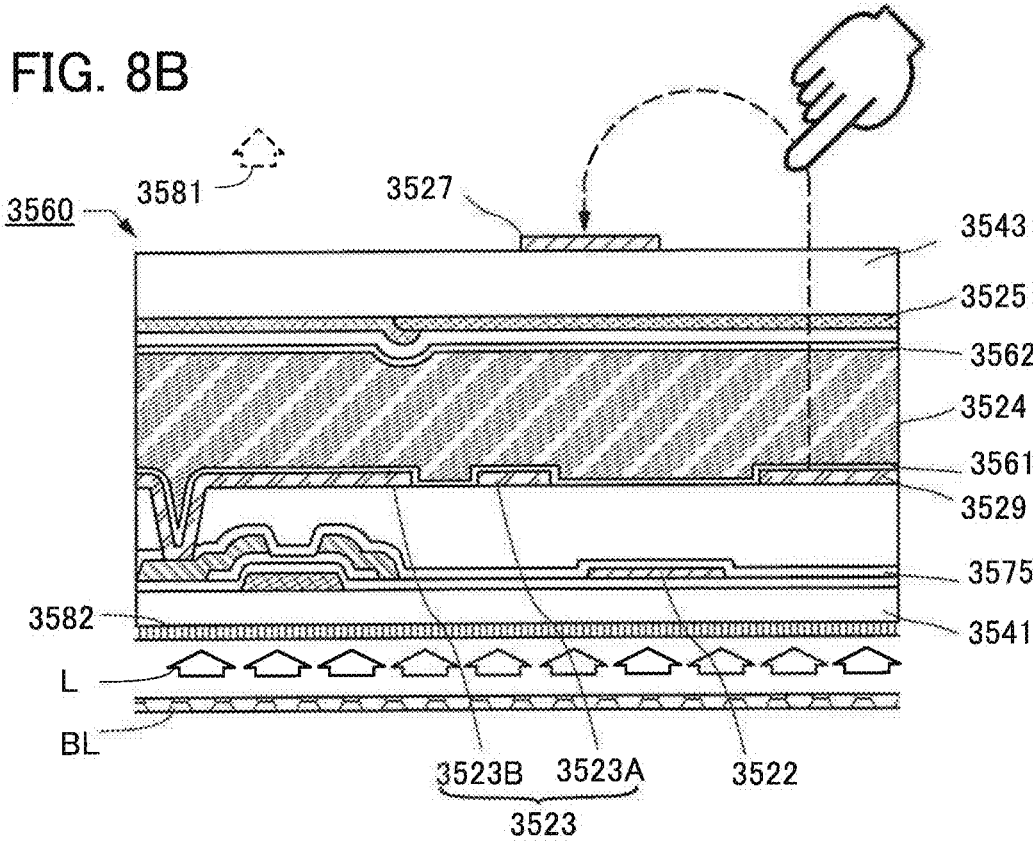

An input/output panel 3560 illustrated in FIG. 8B includes a liquid crystal element having an FFS mode, like the input/output panel 3559 illustrated in FIG. 8A. The electrode 3522 and the electrode 3523 are each formed using a conductive film transmitting visible light. In other words, the input/output panel 3560 has a transmissive liquid crystal element. In the input/output panel 3560, the sensor electrode 3527 and the in-cell sensor electrode 3529 serve as a pair of electrodes, and a change in capacitance is sensed, so that capacitive sensing is performed.

A backlight BL which can perform irradiation with light L in a direction indicated by an arrow 3581 is provided. By the backlight BL, the layer containing a liquid crystal material can be irradiated with light. As the backlight BL, an underneath type or a sidelight type can be used. In addition, a functional film 3582 is provided. In one embodiment of the present invention, the functional film 3582 has a function of a polarizing plate. Although not illustrated, another functional film is provided so that a layer containing a liquid crystal material is sandwiched between the functional film and the functional film 3582.

When each input/output panel described in this specification includes a liquid crystal element, a conductive film transmitting visible light is used for an electrode, whereby application of a transmissive liquid crystal element is achieved. By making the backlight emit light of several colors by a field-sequential method, color display can be performed without forming a coloring film over the liquid crystal element. In that case, by making the backlight emit light of all colors, white display can be achieved.

Two or more features of the input/output panels that can be used in the input/output device of one embodiment of the present invention may be combined. For example, the input/output panel may include three electrodes and be driven by a driving mode of liquid crystal, other than an FFS mode and a VA mode. Alternatively, the input/output panel may be applied to an element with another display method.

This embodiment can be implemented in combination with any of the other embodiments disclosed in this specification as appropriate.

Embodiment 3

An input/output panel of one embodiment of the present invention may have a different structure from those in Embodiments 1 and 2.

In this embodiment, a reflective display element including a layer containing liquid crystal material is a first display element, and a display element having a function of emitting light is a second display element. A structure of an input/output panel 700 including both the first display element and the second display element is described with reference to FIG. 9, FIG. 10, FIGS. 11A to 11C, FIGS. 12A and 12B, FIGS. 13A and 13B, FIGS. 14A and 14B, FIG. 15, and FIGS. 16A to 16C.

Figure 9:
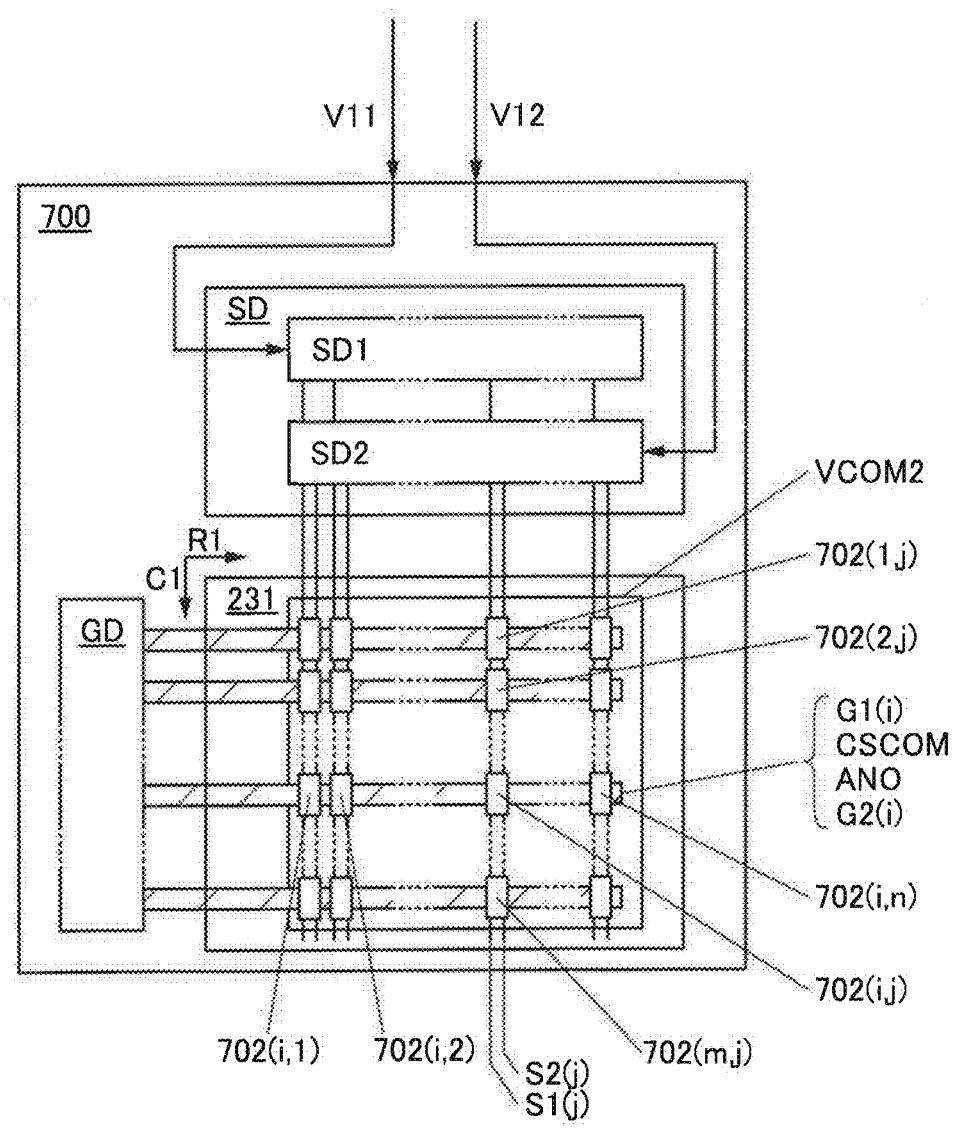
FIG. 9 is a block diagram illustrating a structure of an input/output device of one embodiment.

FIG. 9 is a block diagram illustrating a structure of the input/output device of one embodiment of the present invention. The input/output device includes an input/output panel.

Figure 10:
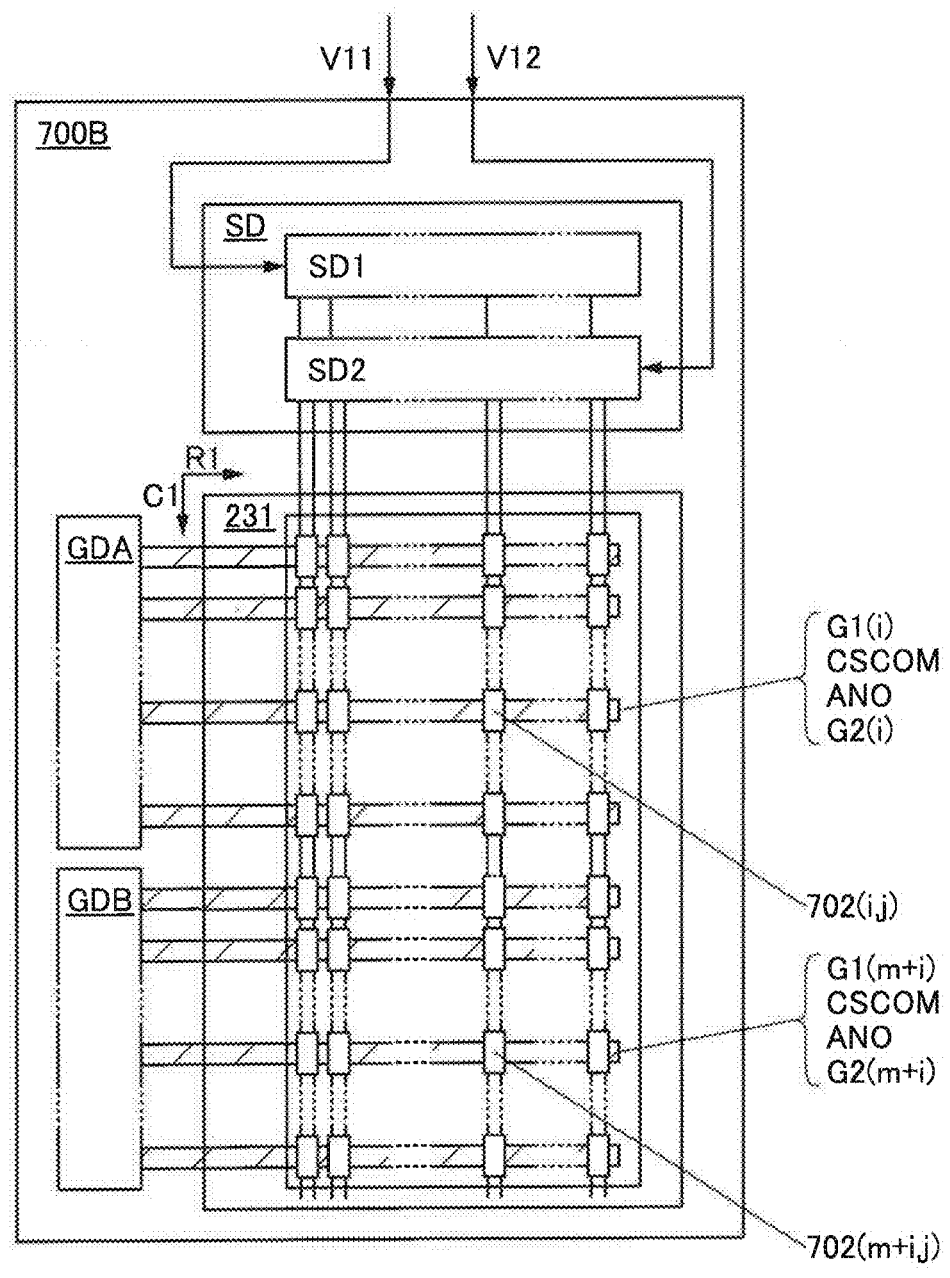
FIG. 10 illustrates a structure of an input/output panel that can be used in an input/output device of one embodiment.

FIG. 10 is a block diagram illustrating a structure of an input/output panel which can be used for an input/output device of one embodiment of the present invention. FIG. 10 is a block diagram illustrating a structure different from that in FIG. 9.

Figure 11A:
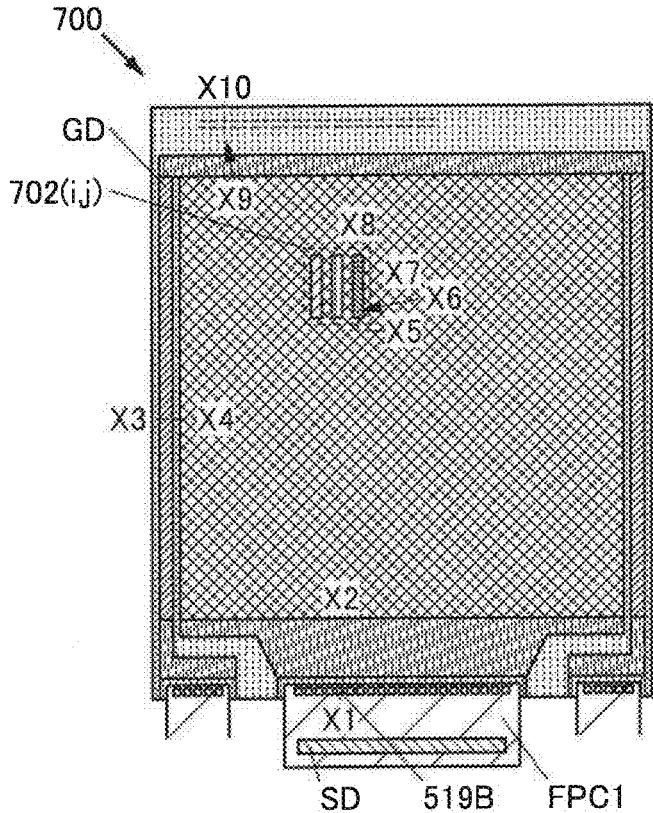
FIGS. 11A to 11C illustrate a structure of an input/output panel that can be used in an input/output device of one embodiment.
Figure 11B:
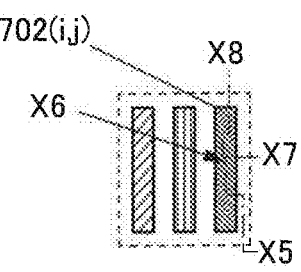
Figure 11C:
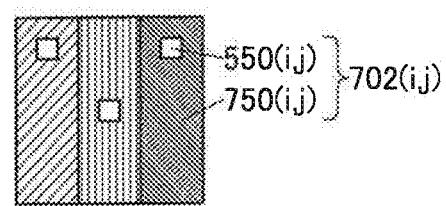

FIGS. 11A to 11C illustrate a structure of an input/output panel that can be used in the input/output device of one embodiment of the present invention. FIG. 11A is a top view of the input/output panel, and FIG. 11B is a top view illustrating part of a pixel in the input/output panel shown in FIG. 11A. FIG. 11C is a schematic view illustrating the structure of the pixel illustrated in FIG. 11B.

Figures 12A, 12B:
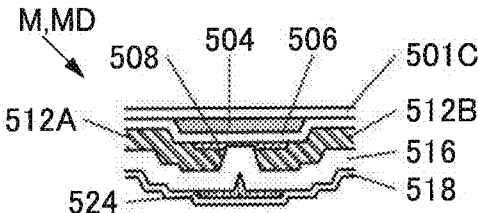
FIGS. 12A and 12B are cross-sectional views illustrating a structure of an input/output panel that can be used in an input/output device of one embodiment.

FIGS. 12A and 12B and FIGS. 13A and 13B are cross-sectional views illustrating the structure of the input/output panel. FIG. 12A is a cross-sectional view taken along cutting lines X1-X2, X3-X4, and X5-X6 in FIG. 11A. FIG. 12B is a cross-sectional view illustrating part of the structure in FIG. 12A.

Figure 13A:
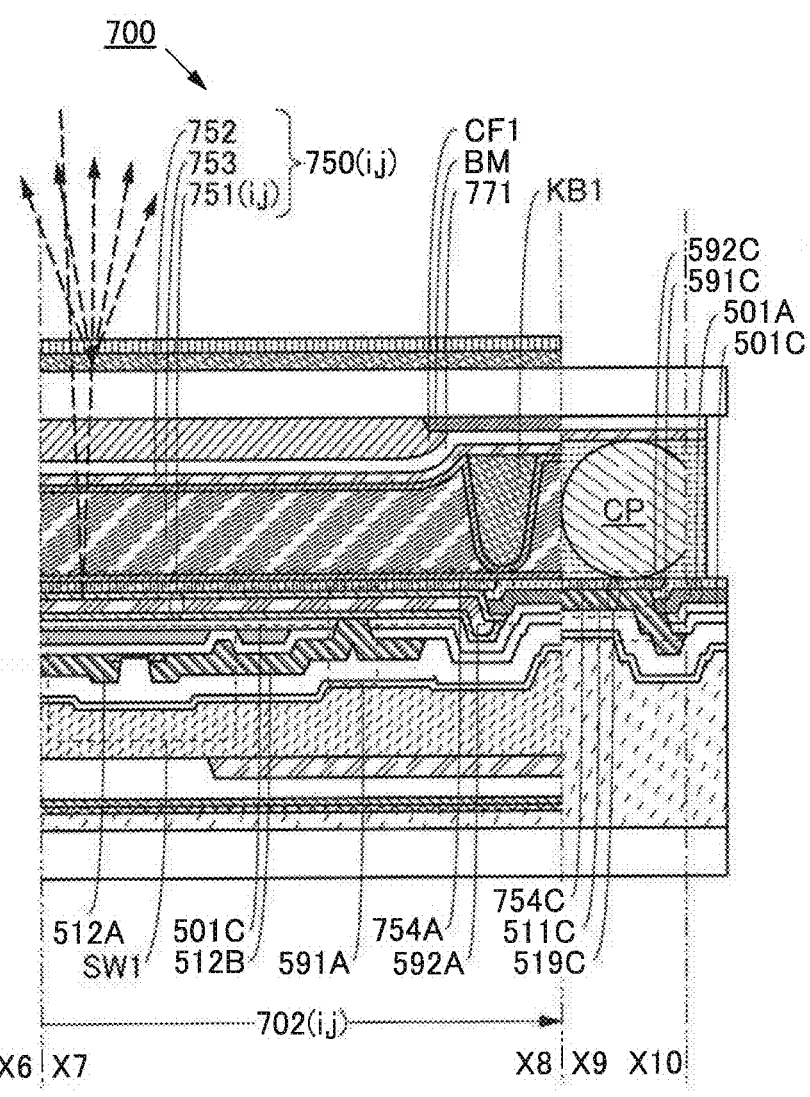
FIGS. 13A and 13B are cross-sectional views illustrating a structure of an input/output panel that can be used in an input/output device of one embodiment.
Figure 13B:
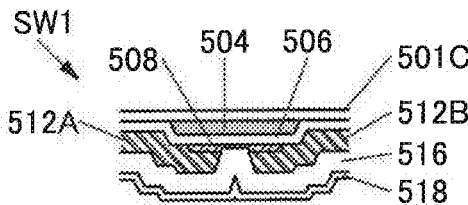

FIG. 13A is a cross-sectional view taken along cutting lines X7-X8 and X9-X10 in FIG. 11A. FIG. 13B is a cross-sectional view illustrating part of the structure in FIG. 13A.

Figure 14A:
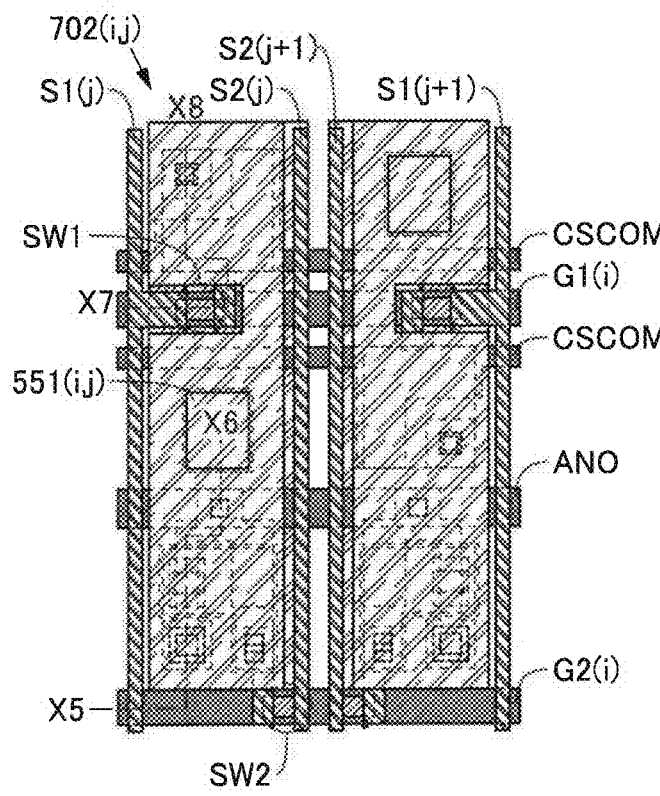
FIGS. 14A and 14B are bottom views illustrating part of a pixel of an input/output panel that can be used in an input/output device of one embodiment.
Figure 14B:
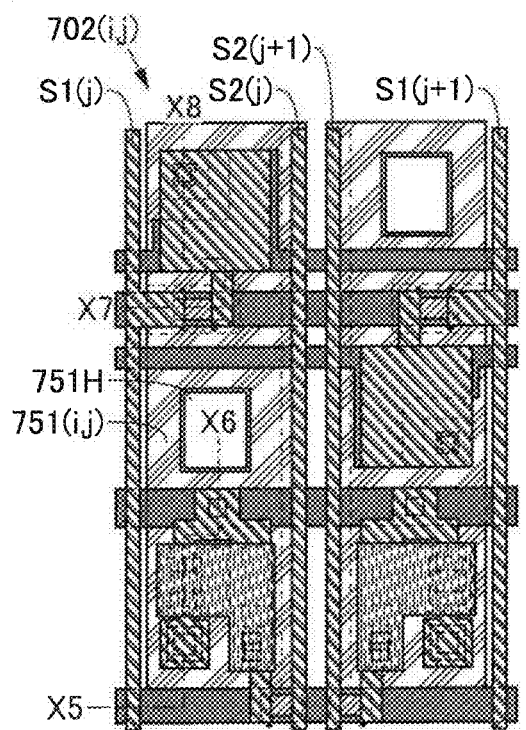

FIG. 14A is a bottom view illustrating part of a pixel in the input/output panel in FIG. 11B. FIG. 14B is a bottom view illustrating the structure in FIG. 14A, in which some components are omitted.

Figure 15:
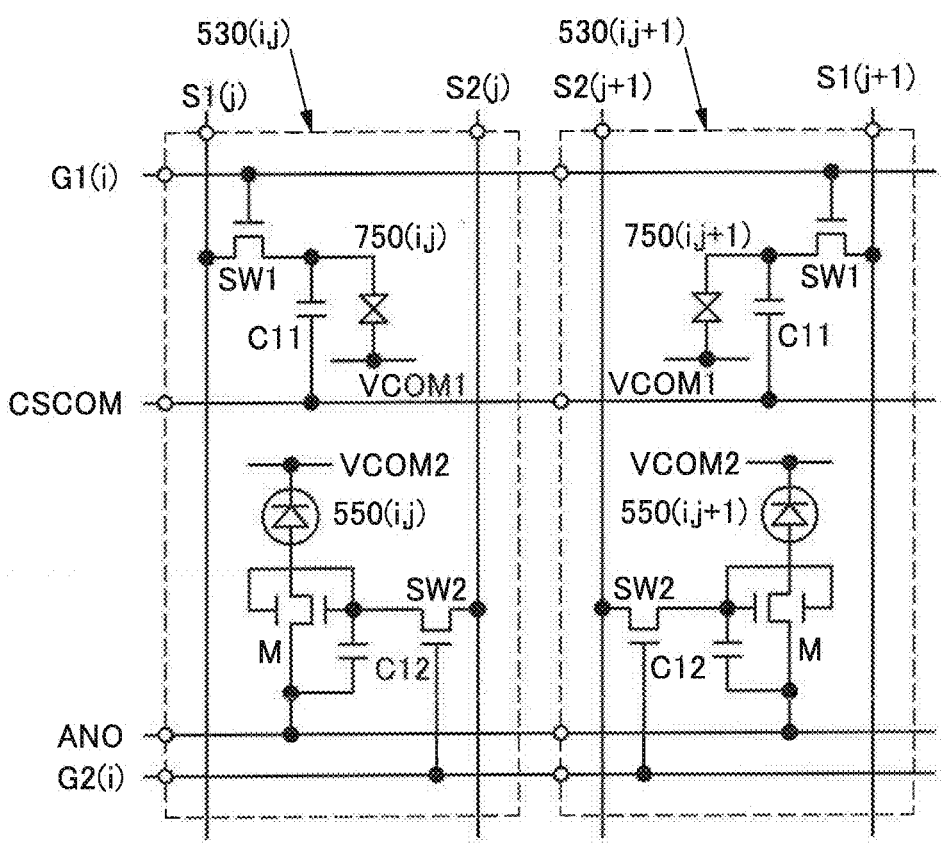
FIG. 15 is a circuit diagram illustrating a pixel circuit provided in an input/output panel that can be used in an input/output device of one embodiment.

FIG. 15 is a circuit diagram illustrating a configuration of a pixel circuit included in the input/output panel one embodiment of the present invention.

Figure 16A:
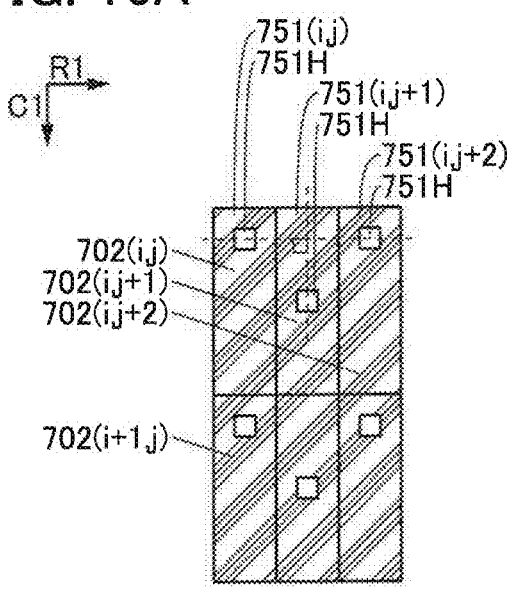
FIGS. 16A to 16C are schematic views each illustrating a shape of a reflective film that can be used for a pixel of an input/output panel that can be used in an input/output device of one embodiment.
Figure 16B:
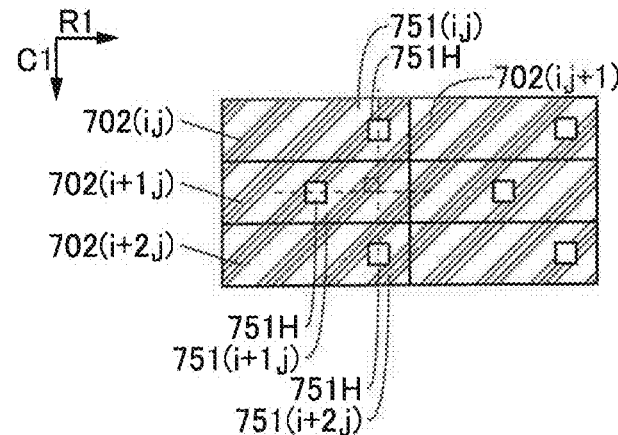
Figure 16C:
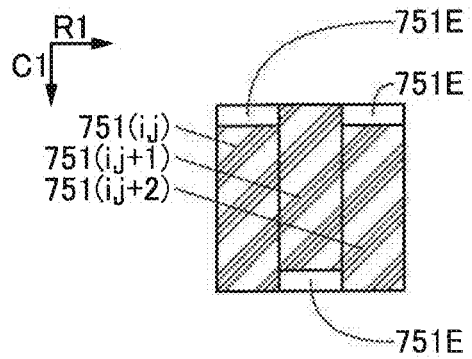

FIGS. 16A to 16C are schematic views illustrating the shape of a reflective film that can be used for a pixel in the input/output panel.

Note that in this specification, an integral variable of 1 or more may be used for reference numerals. For example, "(p)" where p is an integral value of 1 or more may be used for part of a reference numeral that specifies any one of components (p components at a maximum). For another example, "(m, n)" where m and n are each an integral value of 1 or more may be used for part of a reference numeral that specifies any one of components (m×n components at a maximum).

Structure Example 1 of Input/Output Panel

The input/output panel 700 described in this embodiment includes a display region 231 (see FIG. 9). The input/output panel 700 can also include a driver circuit GD or a driver circuit SD.

The input/output panel can include a plurality of driver circuits. For example, an input/output panel 700B includes a driver circuit GDA and a driver circuit GDB (see FIG. 10).

<Display Region 231>

A display region 231 includes one group of pixels 702($i$, 1) to 702($i$, $n$), another group of pixels 702(1, $j$) to 702($m$, $j$), and a scan line G1($i$) (see FIG. 9 and FIGS. 14A and 14B or FIG. 15). In addition, a scanning line G2($i$), a wiring CSCOM, a third conductive film ANO, and a signal line S2($j$) are included. Note that i is an integer greater than or equal to 1 and less than or equal to m, j is an integer greater than or equal to 1 and less than or equal to n, and each of m and n is an integer greater than or equal to 1.

The one group of pixels 702($i$, 1) to 702($i$, $n$) include the pixel 702($i$, $j$) and are provided in the row direction (the direction indicated by the arrow R1 in the drawing).

The another group of pixels 702(1, $j$) to 702($m$, $j$) include the pixel 702($i$, $j$) and are provided in the column direction (the direction indicated by the arrow C1 in the drawing) that intersects the row direction.

The scan line G1($i$) and the scan line G2($i$) are electrically connected to the group of pixels 702($i$, 1) to 702($i$, $n$) provided in the row direction.

The signal line S1($j$) and the signal line S2($j$) are electrically connected to the another group of the pixels 702(1, $j$) to 702($m$, $j$) arranged in the column direction.

<Driver Circuit GD>

The driver circuit GD is configured to supply a selection signal in accordance with the control information.

For example, the driver circuit GD has a function of supplying a selection signal to one scan line at a frequency of 30 Hz or higher, preferably 60 Hz or higher, in accordance with the control information. Accordingly, moving images can be smoothly displayed.

For example, the driver circuit GD has a function of supplying a selection signal to one scan line at a frequency lower than 30 Hz, preferably lower than 1 Hz, further preferably less than once per minute, in accordance with the control information. Accordingly, a still image can be displayed while flickering is suppressed.

For example, in the case where a plurality of driver circuits is provided, the driver circuits GDA and GDB may supply the selection signals at different frequencies. Specifically, the selection signal can be supplied at a higher frequency to a region on which moving images are smoothly displayed than to a region on which a still image is displayed in a state where flickering is suppressed.

<Driver Circuit SD, Driver Circuit SD1, Driver Circuit SD2>

The driver circuit SD includes a driver circuit SD1 and a driver circuit SD2. The driver circuit SD1 has a function of supplying an image signal based on the information V11. The driver circuit SD2 has a function of supplying an image signal based on the information V12 (see FIG. 9).

The driver circuit SD1 has a function of generating an image signal that is to be supplied to a pixel circuit electrically connected to one display element. Specifically, the driver circuit SD1 has a function of generating a signal whose polarity is inverted. Thus, for example, a liquid crystal display element can be driven.

The driver circuit SD2 has a function of generating an image signal that is supplied to a pixel circuit electrically connected to another display element which displays an image by a method different from that of the one display element. The driver circuit SD2 can drive, for example, an organic EL element.

For example, any of a variety of sequential circuits, such as a shift register, can be used as the driver circuit SD.

For example, an integrated circuit in which the driver circuit SD1 and the driver circuit SD2 are integrated can be used as the driver circuit SD. Specifically, an integrated circuit formed on a silicon substrate can be used as the driver circuit SD.

For example, the driver circuit SD can be mounted on a terminal by a chip on glass (COG) method or a chip on film (COF) method. Specifically, an anisotropic conductive film can be used to mount an integrated circuit on the terminal.

<Pixel Structure Example>

The pixel 702($i$, $j$) includes a first display element 750($i$, $j$), a second display element 550($i$, $j$), and part of a functional layer 520 (see FIG. 11C, FIG. 12A, and FIG. 13A).

<Functional Layer>

The functional layer 520 includes a first conductive film, a second conductive film, an insulating film 501C, and a pixel circuit 530($i$, $j$) (see FIGS. 12A and 12B). The functional layer 520 includes an insulating film 521, an insulating film 528, an insulating film 518, and an insulating film 516.

The functional layer 520 includes a region positioned between the substrate 570 and the substrate 770.

<Insulating Film 501C>

The insulating film 501C includes a region positioned between the first conductive film and the second conductive film and has an opening 591A (see FIG. 13A).

<First Conductive Film>

For example, a first electrode 751($i$, $j$) of the first display element 750($i$, $j$) can be used as the first conductive film. The first conductive film is electrically connected to the first electrode 751($i$, $j$).

<Second Conductive Film>

For example, the conductive film 512B can be used as the second conductive film. The second conductive film includes a region overlapping with the first conductive film. The second conductive film is electrically connected to the first conductive film through the opening 591A. Note that the first conductive film electrically connected to the second conductive film in the opening 591A that is formed in the insulating film 501C can be referred to as a through electrode.

The second conductive film is electrically connected to the pixel circuit 530($i$, $j$). For example, a conductive film which functions as a source electrode or a drain electrode of a transistor used as a switch SW1 of the pixel circuit 530($i$, $j$) can be used as the second conductive film.

<Pixel Circuit>

The pixel circuit 530($i$, $j$) has a function of driving the first display element 750($i$, $j$) and the second display element 550($i$, $j$) (see FIG. 15).

Thus, the first display element and the second display element that displays an image using a method different from that of the first display element can be driven using pixel circuits that can be formed in the same process. Specifically, a reflective display element is used as the first display element, whereby the power consumption can be reduced. In addition, an image with high contrast can be favorably displayed in an environment with bright external light. In addition, the second display element which emits light is used, whereby an image can be favorably displayed in a dark environment. Furthermore, using the insulating film, impurity diffusion between the first display element and the second display element or between the first display element and the pixel circuit can be suppressed. As a result, a novel input/output device with high convenience or high reliability can be provided.

A switch, a transistor, a diode, a resistor, an inductor, a capacitor, or the like can be used in the pixel circuit 530($i$, $j$).

For example, one or a plurality of transistors can be used as a switch. Alternatively, a plurality of transistors connected in parallel to each other, in series, or in combination of parallel connection and series connection can be used as a switch.

The pixel circuit 530($i$,$j$) is electrically connected to the signal line S1($j$), the signal line S2($j$), the scan line G1($i$), the scan line G2($i$), the wiring CSCOM, and the third conductive film ANO, for example (see FIG. 15). Note that the conductive film 512A is electrically connected to the signal line S1($j$) (see FIG. 13A and FIG. 15).

The pixel circuit 530($i$, $j$) includes the switch SW1 and a capacitor C11 (see FIG. 15).

The pixel circuit 530($i$, $j$) includes a switch SW2, a transistor M, and a capacitor C12.

For example, a transistor including a gate electrode electrically connected to the scan line G1($i$) and a first electrode electrically connected to the signal line S1($j$) can be used for the switch SW1.

The capacitor C11 includes a first electrode electrically connected to a second electrode of the transistor used as the switch SW1 and a second electrode electrically connected to the wiring CSCOM.

For example, a transistor including a gate electrode electrically connected to the scan line G2($i$) and a first electrode electrically connected to the signal line S2($j$) can be used for the switch SW2.

The transistor M includes a gate electrode electrically connected to the second electrode of the transistor used as the switch SW2 and includes a first electrode electrically connected to the third conductive film ANO.

Note that a transistor including a conductive film provided such that a semiconductor film is interposed between a gate electrode and the conductive film can be used as the transistor M. For example, a conductive film electrically connected to a wiring that can supply a potential the same as that of the gate electrode of the transistor M can be used as the conductive film.

The capacitor C12 includes a first electrode electrically connected to a second electrode of the transistor used as the switch SW2 and a second electrode electrically connected to the first electrode of the transistor M.

A first electrode of the first display element 750($i$, $j$) is electrically connected to the second electrode of the transistor used for the switch SW1. A second electrode of the first display element 750($i$, $j$) is electrically connected to a wiring VCOM1. This enables the first display element 750 to be driven.

Furthermore, a third electrode 551($i$, $j$) and a fourth electrode 552 of the second display element 550($i$, $j$) are electrically connected to the second electrode of the transistor M and a fourth conductive film VCOM2, respectively. This enables the second display element 550($i$, $j$) to be driven.

<First Display Element 750($i$, $j$)>

For example, a display element having a function of controlling transmission or reflection of light can be used as the first display element 750($i$, $j$). Specifically, a reflective liquid crystal display element can be used as the first display element 750($i$, $j$). Alternatively, a MEMS shutter display element and the like can be used. The use of a reflective display element can reduce the power consumption of the input/output panel.

The first display element 750($i$, $j$) includes the first electrode 751($i$, $j$), a second electrode 752, and a layer 753 containing a liquid crystal material. The second electrode 752 is positioned such that an electric field which controls the alignment of the liquid crystal material is generated between the second electrode 752 and the first electrode 751($i$, $j$) (see FIG. 12A and FIG. 13A).

The first electrode 751($i$, $j$) and the second electrode 752 in the input/output panel 700 in FIG. 13A can drive a liquid crystal element by a driving method with a VA mode.

The first display element 750($i$, $j$) includes an alignment film AF1 and an alignment film AF2. The alignment film AF2 includes a region provided so that a layer 753 containing a liquid crystal material is positioned between the alignment film AF2 and the alignment film AF1.

<Second Display Element 550($i$, $j$)>

A display element having a function of emitting light can be used as the second display element 550($i$, $j$), for example. Specifically, an organic EL element and the like can be used. The second display element 550($i$, $j$) has a function of emitting light toward the second insulating film 501C (see FIG. 12A).

The second display element 550($i$, $j$) is provided so that a displayed image by the second display element 550($i$, $j$) can be seen from part of a region from which a displayed image by the first display element 750($i$, $j$) can be seen. For example, dashed arrows shown in FIG. 13A denote the directions in which external light is incident on and reflected by the first display element 750($i$, $j$) that displays the image data with control of the intensity of external light reflection. In addition, a solid arrow shown in FIG. 12A denotes the direction in which the second display element 550($i$, $j$) emits light to the part of the region from which the displayed image by the first display element 750($i$, $j$) can be seen.

Accordingly, the displayed image by the second display element can be seen from part of the region where the displayed image by the first display element can be seen. Alternatively, a user can see display without changing the orientation or the like of the input/output panel. As a result, a novel input/output panel that is highly convenient or reliable can be provided.

The second display element 550($i$, $j$) t includes a third electrode 551($i$, $j$), a fourth electrode 552, and a layer 553($j$) containing a light-emitting material (see FIG. 12A). The fourth electrode 552 includes a region overlapping with the third electrode 551($i$, $j$).

The layer 553($j$) containing a light-emitting material includes a region sandwiched between the third electrode 551($i$, $j$) and the fourth electrode 552.

The third electrode 551($i$, $j$) is electrically connected to the pixel circuit 530($i$, $j$) at a connection portion 522. Note that the third electrode 551($i$, $j$) and the fourth electrode 552 are electrically connected to the third conductive film ANO and a fourth conductive film VCOM2, respectively (see FIG. 15).

<Intermediate Film>

The input/output panel described in this embodiment includes an intermediate film 754A, an intermediate film 754B, and an intermediate film 754C.

The intermediate film 754A includes a region which overlaps with the insulating film 501C with the first conductive film interposed therebetween, and the intermediate film 754A includes a region in contact with first electrode 751($i$, $j$). The intermediate film 754B includes a region in contact with a conductive film 511B. The intermediate film 754C includes a region in contact with the conductive film 511C.

<Insulating Film 501A>

The input/output panel described in this embodiment includes an insulating film 501A (see FIG. 12A).

The insulating film 501A has a first opening 592A, a second opening 592B, and an opening 592C (see FIG. 12A and FIG. 13A).

The first opening 592A includes a region overlapping with the intermediate film 754A and the first electrode 751($i$, $j$) or a region overlapping with the intermediate film 754A and the insulating film 501C.

The second opening 592B includes a region overlapping with the intermediate film 754B and the conductive film 511B.

Furthermore, the opening 592C includes a region overlapping with the intermediate film 754C and the conductive film 511C.

The insulating film 501A includes a region where the insulating film 501C is sandwiched between the insulating film 501A and the conductive film 511B. The insulating film 501A is in contact with the conductive film 511B in an opening 591B provided in the insulating film 501C. The insulating film 501A is in contact with the conductive film 511C in an opening 591C provided in the insulating film 501C.

The insulating film 501A includes a region sandwiched between the intermediate film 754A and the insulating film 501C along the periphery of the first opening 592A. The insulating film 501A includes a region sandwiched between the intermediate film 754B and the conductive film 511B along the periphery of the second opening 592B.

<Insulating Film 521, Insulating Film 528, Insulating Film 518, Insulating Film 516, and the Like>

The insulating film 521 includes a region sandwiched between the pixel circuit 530($i$, $j$) and the second display element 550($i$, $j$).

The insulating film 528 is provided between the insulating film 521 and the substrate 570, and has an opening in a region overlapping with the second display element 550($i$, $j$).

The insulating film 528 formed along the periphery of the third electrode 551($i$, $j$) can prevent a short circuit between the third electrode 551($i$, $j$) and the fourth electrode.

The insulating film 518 includes a region sandwiched between the insulating film 521 and the pixel circuit 530($i$, $j$).

The insulating film 516 includes a region sandwiched between the insulating film 518 and the pixel circuit 530($i$, $j$).

<Terminal and the Like>

The input/output panel described in this embodiment includes a terminal 519B and a terminal 519C.

The terminal 519B includes the conductive film 511B and the intermediate film 754B, and the intermediate film 754B includes a region in contact with the conductive film 511B. The terminal 519B is electrically connected to the signal line S1($j$), for example.

The terminal 519C includes the conductive film 511C and the intermediate film 754C, and the intermediate film 754C includes a region in contact with the conductive film 511C. The conductive film 511C is electrically connected to the wiring VCOM1, for example.

A conductive material CP is sandwiched between the terminal 519C and the second electrode 752, and electrically connects the terminal 519C and the second electrode 752. For example, a conductive particle can be used as the conductive material CP.

<Substrate and the Like>

The input/output panel described in this embodiment includes the substrate 570 and the substrate 770.

The substrate 770 includes a region overlapping with the substrate 570. The substrate 770 includes a region provided so that the functional layer 520 is positioned between substrate 770 and the substrate 570.

<Bonding Layer, Sealant, Structure Body, and the Like>

The input/output panel described in this embodiment also includes a bonding layer 505, a sealing material 705, and a structure body KB1.

The bonding layer 505 includes a region sandwiched between the functional layer 520 and the substrate 570, and has a function of bonding the functional layer 520 and the substrate 570 together.

The sealing material 705 includes a region sandwiched between the functional layer 520 and the substrate 770, and has a function of bonding the functional layer 520 and the substrate 770 together.

The structure body KB1 has a function of providing a certain space between the functional layer 520 and the substrate 770.

<Functional Film and the Like>

The input/output panel described in this embodiment includes a light-blocking film BM, an insulating film 771, a functional film 770P, and a functional film 770D. In addition, a coloring film CF1 and a coloring film CF2 are included.

The light-blocking film BM has an opening in a region overlapping with the first display element 750($i$, $j$). The coloring film CF2 is provided between the insulating film 501C and the second display element 550($i$, $j$) and includes a region overlapping with an opening 751H (see FIG. 12A).

The insulating film 771 includes a region sandwiched between the coloring film CF1 and the layer 753 containing a liquid crystal material or between the light-blocking film BM and the layer 753 containing a liquid crystal material. The insulating film 771 can reduce unevenness due to the thickness of the coloring film CF1. Alternatively, impurities can be prevented from being diffused from the light blocking film BM, the coloring film CF1, or the like to the layer 753 containing a liquid crystal material The functional film 770P includes a region overlapping with the first display element 750(i,j).

The functional film 770D includes a region overlapping with the first display element 750(i, j). The functional film 770D is provided so that a substrate 770 lies between the functional film 770D and the first display element 750(i, j). Thus, for example, light reflected by the first display element 750(i, j) can be diffused.

<Example of Components>

The input/output panel 700 includes the substrate 570, the substrate 770, the structure body KB1, the sealing material 705, or the bonding layer 505.

The input/output panel 700 also includes the functional layer 520, the insulating film 521, or the insulating film 528.

The input/output panel 700 also includes the signal line S1(j), the signal line S2(j), the scan line G1(i), the scan line G2(i), the wiring CSCOM, or the third conductive film ANO.

The input/output panel 700 also includes the first conductive film or the second conductive film.

The input/output panel 700 also includes the terminal 519B, the terminal 519C, the conductive film 511B, or the conductive film 511C.

The input/output panel 700 also includes the pixel circuit 530(i, j) or the switch SW1.

The input/output panel 700 also includes the first display element 750(i, j), the first electrode 751(i, j), the reflective film, the opening, the layer 753 containing a liquid crystal material, or the second electrode 752.

The input/output panel 700 also includes the alignment film AF1, the alignment film AF2, the coloring film CF1, the coloring film CF2, the light-blocking film BM, the insulating film 771, the functional film 770P, or the functional film 770D.

In addition, the input/output panel 700 includes the second display element 550(i, j), the third electrode 551(i, j), the fourth electrode 552, or the layer 553(j) containing a light-emitting material.

In addition, the input/output panel 700 includes the insulating film 501A and the insulating film 501C.

The input/output panel 700 includes the driver circuit GD and the driver circuit SD.

<Substrate 570>

The substrate 570 or the like can be formed using a material having heat resistance high enough to withstand heat treatment in the manufacturing process. For example, a material with a thickness greater than or equal to 0.1 mm and less than or equal to 0.7 mm can be used for the substrate 570. Specifically, a material polished to a thickness of approximately 0.1 mm can be used.

For example, a large-sized glass substrate having any of the following sizes can be used as the substrate 570 or the like: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized input/output device can be fabricated.

For the substrate 570 or the like, an organic material, an inorganic material, a composite material of an organic material and an inorganic material, or the like can be used. For example, an inorganic material such as glass, ceramic, or metal can be used for the substrate 570 or the like.

Specifically, non-alkali glass, soda-lime glass, potash glass, crystal glass, aluminosilicate glass, tempered glass, chemically tempered glass, quartz, sapphire, or the like can be used for the substrate 570 or the like. Specifically, an inorganic oxide film, an inorganic nitride film, an inorganic oxynitride film, or the like can be used for the substrate 570 or the like. For example, a silicon oxide film, a silicon nitride film, a silicon oxynitride film, an aluminum oxide film, or the like can be used for the substrate 570 or the like. Stainless steel, aluminum, or the like can be used for the substrate 570 or the like.

For example, a single crystal semiconductor substrate or a polycrystalline semiconductor substrate of silicon or silicon carbide, a compound semiconductor substrate of silicon germanium or the like, or an SOI substrate can be used as the substrate 570 or the like. Thus, a semiconductor element can be provided over the substrate 570 or the like.

For example, an organic material such as a resin, a resin film, or plastic can be used for the substrate 570 or the like. Specifically, a resin film or resin plate of polyester, polyolefin, polyamide, polyimide, polycarbonate, an acrylic resin, or the like can be used for the substrate 570 or the like.

For example, a composite material formed by attaching a metal plate, a thin glass plate, or a film of an inorganic material to a resin film or the like can be used for the substrate 570 or the like. For example, a composite material formed by dispersing a fibrous or particulate metal, glass, inorganic material, or the like into a resin film can be used for the substrate 570 or the like. For example, a composite material formed by dispersing a fibrous or particulate resin, organic material, or the like into an inorganic material can be used for the substrate 570 or the like.

Furthermore, a single-layer material or a layered material in which a plurality of layers are stacked can be used for the substrate 570 or the like. For example, a layered material in which a base, an insulating film that prevents diffusion of impurities contained in the base, and the like are stacked can be used for the substrate 570 or the like. Specifically, a layered material in which glass and one or a plurality of films that are selected from a silicon oxide layer, a silicon nitride layer, a silicon oxynitride layer, and the like and that prevent diffusion of impurities contained in the glass are stacked can be used for the substrate 570 or the like. Alternatively, a layered material in which a resin and a film for preventing diffusion of impurities that penetrate the resin, such as a silicon oxide film, a silicon nitride film, and a silicon oxynitride film are stacked can be used for the substrate 570 or the like.

Specifically, a resin film, a resin plate, a stacked-layer material, or the like containing polyester, polyolefin, polyamide, polyimide, polycarbonate, an acrylic resin, or the like can be used as the substrate 570 or the like.

Specifically, a material including polyester, polyolefin, polyamide (e.g., nylon or aramid), polyimide, polycarbonate, an acrylic resin, a urethane resin, an epoxy resin, a resin having a siloxane bond, such as silicone, or the like can be used for the substrate 570 or the like. Specifically, polyethylene terephthalate (PET), polyethylene naphthalate (PEN), polyethersulfone (PES), acrylic, or the like can be used for the substrate 570 or the like. Alternatively, a cyclo olefin polymer (COP), a cyclo olefin copolymer (COC), or the like can be used.

Alternatively, paper, wood, or the like can be used for the substrate 570 or the like.

For example, a flexible substrate can be used as the substrate 570 or the like.

Note that a transistor, a capacitor, or the like can be directly formed on the substrate. Alternatively, a transistor, a capacitor, or the like formed on a substrate for use in manufacturing processes which can withstand heat applied in the manufacturing process can be transferred to the substrate 570 or the like. Thus, a transistor, a capacitor, or the like can be formed over a flexible substrate, for example.

<Substrate 770>

For example, a light-transmitting material can be used for the substrate 770. Specifically, any of the materials that can be used for the substrate 570 can be used for the substrate 770.

For example, aluminosilicate glass, tempered glass, chemically tempered glass, sapphire, or the like can be favorably used for the substrate 770 that is on a side closer to a user of the input/output panel. This can prevent damage or a crack of the input/output panel caused by the use thereof.

A material with a thickness greater than or equal to 0.1 mm and less than or equal to 0.7 mm can be also used for the substrate 770, for example. Specifically, a substrate polished for reducing the thickness can be used. In that case, the functional film 770D can be close to the first display element 750(*i, j*). As a result, image blur can be reduced and an image can be displayed clearly.

<Structure Body KB1>

The structure body KB1 or the like can be formed using an organic material, an inorganic material, or a composite material of an organic material and an inorganic material. Accordingly, a predetermined space can be provided between components between which the structure KB1 and the like are provided.

Specifically, for the structure KB1, polyester, polyolefin, polyamide, polyimide, polycarbonate, polysiloxane, an acrylic resin, or the like, or a composite material of a plurality of resins selected from these can be used. Alternatively, a photosensitive material may be used.

<Sealing Material 705>

For the sealing material 705 or the like, an inorganic material, an organic material, a composite material of an inorganic material and an organic material, or the like can be used.

For example, an organic material such as a thermally fusible resin or a curable resin can be used for the sealing material 705 or the like.

For example, an organic material such as a reactive curable adhesive, a light curable adhesive, a thermosetting adhesive, and/or an anaerobic adhesive can be used for the sealing material 705 or the like.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin, or the like can be used for the sealing material 705 or the like.

<Bonding Layer 505>

For example, any of the materials that can be used for the sealing material 705 can be used for the bonding layer 505.

<Insulating Layer 521>

For example, an insulating inorganic material, an insulating organic material, an insulating composite material containing an inorganic material and an organic material, or the like can be used for the insulating film 521 or the like.

Specifically, for example, an inorganic oxide film, an inorganic nitride film, an inorganic oxynitride film, or a material obtained by stacking any of these films and the like can be used as the insulating film 521 or the like. For example, a film including any of a silicon oxide film, a silicon nitride film, a silicon oxynitride film, an aluminum oxide film, and a film including a material obtained by stacking any of these films and the like can be used as the insulating film 521 or the like.

Specifically, for the insulating film 521 or the like, polyester, polyolefin, polyamide, polyimide, polycarbonate, polysiloxane, an acrylic resin, or the like, or a layered or composite material of a plurality of kinds of resins selected from these can be used. Alternatively, a photosensitive material may be used.

Thus, steps due to various components overlapping with the insulating film 521, for example, can be reduced.

<Insulating Film 528>

For example, any of the materials that can be used for the insulating film 521 can be used for the insulating film 528 or the like. Specifically, a 1-μm-thick polyimide-containing film can be used as the insulating film 528.

<Insulating Film 501A>

For example, any of the materials that can be used for the insulating film 521 can be used for the insulating film 501A. Alternatively, for example, a material having a function of supplying hydrogen can be used for the insulating film 501A.

Specifically, a material in which a material containing silicon and oxygen and a material containing silicon and nitrogen are stacked can be used for the insulating film 501A. For example, a material having a function of releasing hydrogen by heating or the like to supply the hydrogen to another component can be used for the insulating film 501A. Specifically, a material having a function of releasing hydrogen taken in the manufacturing process, by heating or the like, to supply the hydrogen to another component can be used for the insulating film 501A.

For example, a film containing silicon and oxygen that is formed by a chemical vapor deposition method using silane or the like as a source gas can be used as the insulating film 501A.

Specifically, a material in which a 200- to 600-nm-thick material containing silicon and oxygen and a material containing silicon and nitrogen with a thickness of approximately 200 nm are stacked can be used for the insulating film 501A.

<Insulating Film 501C>

For example, any of the materials that can be used for the insulating film 521 can be used for the insulating film 501C. Specifically, a material containing silicon and oxygen can be used for the insulating film 501C. Thus, diffusion of impurities into the pixel circuit, the second display element, or the like can be inhibited.

For example, a 200-nm-thick film containing silicon, oxygen, and nitrogen can be used as the insulating film 501C.

<Intermediate Film 754A, Intermediate Film 754B, Intermediate Film 754C>

A film with a thickness greater than or equal to 10 nm and less than or equal to 500 nm, preferably greater than or equal to 10 nm and less than or equal to 100 nm, can be used for the intermediate film 754A, the intermediate film 754B, or the intermediate film 754C, for example. Note that in this this specification, the intermediate film 754A, the intermediate film 754B, or the intermediate film 754C is referred to as an intermediate film.

For example, a material having a function of allowing hydrogen passage and supplying hydrogen can be used for the intermediate film.

For example, a conductive material can be used for the intermediate film.

For example, a light-transmitting material can be used for the intermediate film.

Specifically, a material containing indium and oxygen, a material containing indium, gallium, zinc, and oxygen, a material containing indium, tin, and oxygen, or the like can be used for the intermediate film. Note that the above material is permeable to hydrogen.

Specifically, a 50- or 100-nm-thick film containing indium, gallium, zinc, and oxygen can be used as the intermediate film.

Note that a material in which films serving as etching stoppers are stacked can be used for the intermediate film. Specifically, a material in which a 50-nm-thick film containing indium, gallium, zinc, and oxygen and a 20-nm-thick film containing indium, tin, and oxygen, are stacked in this order can be used for the intermediate film.

<Wiring, Terminal, and Conductive Film>

A conductive material can be used for the wiring or the like. Specifically, the conductive material can be used for the signal line S1($j$), the signal line S2($j$), the scan line G1($i$), the scan line G2($i$), the wiring CSCOM, the third conductive film ANO, the terminal 519B, the terminal 519C, a terminal 719, the conductive film 511B, the conductive film 511C, or the like.

For example, an inorganic conductive material, an organic conductive material, a metal, conductive ceramics, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, any of the following structures can be used for the wiring or the like: a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like.

Specifically, a conductive oxide, such as indium oxide, indium tin oxide, indium zinc oxide, zinc oxide, or zinc oxide to which gallium is added, can be used for the wiring or the like.

Specifically, a film containing graphene or graphite can be used for the wiring or the like.

For example, a film including graphene oxide is formed and is subjected to reduction, so that a film including graphene can be formed. As a reducing method, a method with application of heat, a method using a reducing agent, or the like can be employed.

A film containing a metal nanowire can be used for the wiring or the like, for example. Specifically, a nanowire containing silver can be used.

Specifically, a conductive high molecular compound can be used for the wiring or the like.

Note that the terminal 519B can be electrically connected to a flexible printed circuit FPC1 using a conductive material ACF1, for example.

<First Conductive Film, Second Conductive Film>

For example, any of the materials that can be used for the wiring or the like can be used for the first conductive film or the second conductive film.

Alternatively, the first electrode 751($i,j$), the wiring, or the like can be used for the first conductive film.

The conductive film 512B functioning as the source electrode or the drain electrode of the transistor that can be used for the switch SW1, the wiring, or the like can be used for the second conductive film.

<First Display Element 750($i, j$)>

For example, a display element having a function of controlling transmission or reflection of light can be used as the first display element 750($i, j$). For example, a combined structure of a polarizing plate and a liquid crystal element or a MEMS shutter display element can be used. Specifically, a reflective liquid crystal display element can be used as the first display element 750($i, j$). The use of a reflective display element can reduce the power consumption of the input/output panel.

For example, a liquid crystal element driven in any of the following driving modes can be used: an in-plane switching (IPS) mode, a twisted nematic (TN) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

The first display element 750($i, j$) includes a first electrode, a second electrode, and a layer containing a liquid crystal material. The layer containing a liquid crystal material contains a liquid crystal material whose orientation is controlled by voltage applied between the first electrode and the second electrode. For example, the orientation of the liquid crystal material can be controlled by an electric field in the thickness direction (also referred to as the vertical direction) or an electric field in the direction that intersects the vertical direction (also referred to as the horizontal direction or the diagonal direction) of the layer containing a liquid crystal material.

<Layer 753 Containing Liquid Crystal Material>

For example, thermotropic liquid crystal, low-molecular liquid crystal, high-molecular liquid crystal, polymer dispersed liquid crystal, ferroelectric liquid crystal, anti-ferroelectric liquid crystal, or the like can be used for the layer containing a liquid crystal material. Alternatively, a liquid crystal material which exhibits a cholesteric phase, a smectic phase, a cubic phase, a chiral nematic phase, an isotropic phase, or the like can be used. Alternatively, a liquid crystal material which exhibits a blue phase can be used.

<First Electrode 751($i, j$)>

For example, the material that is used for the wiring or the like can be used for the first electrode 751($i, j$). Specifically, a reflective film can be used for the first electrode 751($i, j$). For example, a material in which a light-transmitting conductive film and a reflective film having an opening are stacked can be used for the first electrode 751($i, j$).

<Reflective Film>

For example, a material that reflects visible light can be used for the reflective film. Specifically, a material containing silver can be used for the reflective film. For example, a material containing silver, palladium, and the like or a material containing silver, copper, and the like can be used for the reflective film.

The reflective film reflects light that passes through the layer 753 containing a liquid crystal material, for example. This allows the first display element 750 to serve as a reflective liquid crystal element. Alternatively, for example, a material with unevenness on its surface can be used for the reflective film. In that case, incident light can be reflected in various directions so that a white image can be displayed.

For example, the first conductive film, the first electrode 751(i, j), or the like can be used as a reflective film.

For example, the reflective film can be provided as a film including a region sandwiched between the layer 753 containing a liquid crystal material and the first electrode 751(i, j). Alternatively, the reflective film can be provided as a film including a region sandwiched between the layer 753 containing a liquid crystal material and the first electrode 751(i, j) with light transmitting property.

The reflective film has a shape including a region that does not block light emitted from the second display element 550(i, j), for example.

For example, the reflective film can have one or more openings.

The opening may have a polygonal shape, a quadrangular shape, an elliptical shape, a circular shape, a cross-like shape, or the like. The opening 751H may also have a stripe shape, a slit-like shape, or a checkered pattern.

If the ratio of the total area of the opening 751H to the total area of the reflective film other than the opening is excessively high, an image displayed using the first display element 750(i, j) is dark.

If the ratio of the total area of the opening 751H to the total area of the reflective film other than the opening is excessively low, an image displayed using the second display element 550(i, j) is dark. Alternatively, the reliability of the second display element 550(i, j) is reduced in some cases.

The opening 751H of a pixel 702(i, j+1), which is adjacent to the pixel 702(i, j), is not provided on a line that extends in the row direction (the direction indicated by the arrow R1 in each of FIGS. 16A to 16C) through the opening 751H of the pixel 702(i, j) (see FIG. 16A). Alternatively, for example, the opening 751H of a pixel 702(i+1,j), which is adjacent to the pixel 702(i, j), is not provided on a line that extends in the column direction (the direction indicated by an arrow C1 in the drawing) through the opening 751H of the pixel 702(i, j) (see FIG. 16B). For example, the opening 751H of a pixel 702(i, j+2) is provided on a line that extends in the row direction through the opening 751H of the pixel 702(i, j) (see FIG. 16A). In addition, the opening 751H of the pixel 702(i, j+1) is provided on a line that is perpendicular to the above-mentioned line between the opening 751H of the pixel 702(i, j) and the opening 751H of the pixel 702(i, j+2).

Alternatively, for example, the opening 751H of the pixel 702(i+2, j) is provided on a line that extends in the column direction through the opening 751H of the pixel 702(i, j) (see FIG. 16B). In addition, for example, the opening 751H of the pixel 702(i+1, j) is provided on a line that is perpendicular to the above-mentioned line between the opening 751H of the pixel 702(i, j) and the opening 751H of the pixel 702(i+2, j).

Thus, the second display element that includes a region overlapping with an opening of a pixel adjacent to one pixel can be apart from the second display element that includes a region overlapping with an opening of the one pixel. A display element which displays color different from that displayed from the second display element of one pixel can be provided as the second display element of another pixel adjacent to the one pixel. The difficulty in arranging a plurality of display elements displaying different colors adjacent to each other can be lowered. As a result, a novel input/output panel that is highly convenient or reliable can be provided.

For example, the reflective film can be formed using a material having a shape in which an end portion is cut off so as to form a region 751E that does not block light emitted from the second display element 550(i, j) (see FIG. 16C). Specifically, the first electrode 751(i, j) whose end portion is cut off so as to be shorter in the column direction (the direction indicated by an arrow C1 in the drawing) can be used as the reflective film.

<Second Electrode 752>

For example, a conductive material can be used for the second electrode 752. For example, a material that transmits visible light can be used for the second electrode 752.

For example, a conductive oxide, a metal film thin enough to transmit light, or a metal nanowire can be used for the second electrode 752.

Specifically, a conductive oxide containing indium can be used for the second electrode 752. Alternatively, a metal thin film with a thickness greater than or equal to 1 nm and less than or equal to 10 nm can be used for the second electrode 752. Alternatively, a metal nanowire containing silver can be used for the second electrode 752.

Specifically, indium oxide, indium tin oxide, indium zinc oxide, zinc oxide, zinc oxide to which gallium is added, zinc oxide to which aluminum is added, or the like can be used for the second electrode 752.

<Alignment Films AF1 and AF2>

The alignment films AF1 and AF2 can be formed using a material containing polyimide or the like, for example. Specifically, a material formed by rubbing treatment or an optical alignment technique such that a liquid crystal material has a predetermined alignment can be used.

For example, a film containing soluble polyimide can be used for the alignment films AF1 and AF2. In this case, the temperature required in forming the alignment film AF1 can be low. Accordingly, damage to other components at the time of forming the alignment film AF1 can be suppressed.

<Coloring Films CF1 and CF2>

A material that transmits light of a predetermined color can be used for the coloring film CF1 or the coloring film CF2. In that case, the coloring film CF1 or the coloring film CF2 can be used as a color filter, for example. For example, a material that transmits blue light, green light, or red light can be used for the coloring film CF1 or the coloring film CF2. Furthermore, a material that transmits yellow light, white light, or the like can be used for the coloring film.

Note that a material having a function of converting the emitted light to a predetermined color light can be used for the coloring film CF2. Specifically, quantum dots can be used for the coloring film CF2. Thus, display with high color purity can be achieved.

<Light-Blocking Film BM>

The light-blocking film BM can be formed with a material that prevents light transmission and can thus be used as a black matrix, for example.

<Insulating Film 771>

The insulating film 771 can be formed of polyimide, epoxy resin, acrylic resin, or the like.

<Functional Films 770P and 770D>

An anti-reflection film, a polarizing film, a retardation film, a light diffusion film, a condensing film, or the like can be used for the functional film 770P or the functional film 770D, for example.

Specifically, a film containing a dichromatic pigment can be used for the functional film 770P or the functional film 770D. Alternatively, a material with a columnar structure having an axis along the direction intersecting a surface of a base can be used for the functional film 770P or the functional film 770D. In that case, light can be transmitted in the direction along the axis and scattered in other directions easily.

Alternatively, an antistatic film preventing the attachment of a foreign substance, a water repellent film suppressing the attachment of stain, a hard coat film suppressing a scratch in use, or the like can be used as the functional film 770P.

Specifically, a circularly polarizing film can be used for the functional film 770P. Furthermore, a light diffusion film can be used for the functional film 770D.

<Second Display Element 550(*i*, *j*)>

A light-emitting element, for example, can be used as the second display element 550(*i*, *j*). Specifically, an organic electroluminescent element, an inorganic electroluminescent element, a light-emitting diode, a quantum-dot light-emitting diode (QDLED), or the like can be used as the second display element 550(*i*, *j*).

For example, a light-emitting organic compound can be used for the layer 553(*j*) containing a light-emitting material.

For example, quantum dots can be used for the layer 553(*j*) containing a light-emitting material. Accordingly, the half width becomes narrow, and light of a bright color can be emitted. A stacked-layer material for emitting blue light, green light, or red light can be used for the layer 553(*j*) containing a light-emitting material, for example.

For example, a belt-like layered material that extends in the column direction along the signal line S2(*j*) can be used for the layer 553(*j*) containing a light-emitting material.

Alternatively, a layered material for emitting white light can be used for the layer 553(*j*) containing a light-emitting material. Specifically, a layered material in which a layer containing a light-emitting material including a fluorescent material that emits blue light, and a layer containing materials that are other than a fluorescent material and that emit green light and red light or a layer containing a material that is other than a fluorescent material and that emits yellow light are stacked can be used for the layer 553(*j*) containing a light-emitting material.

For example, a material that can be used for the wiring or the like can be used for the third electrode 551(*i*, *j*).

For example, a material that transmits visible light among the materials that can be used for the wiring or the like can be used for the third electrode 551(*i*, *j*).

Specifically, conductive oxide, indium-containing conductive oxide, indium oxide, indium tin oxide, indium zinc oxide, zinc oxide, zinc oxide to which gallium is added, or the like can be used for the third electrode 551(*i*, *j*). Alternatively, a metal film that is thin enough to transmit light can be used as the third electrode 551(*i*, *j*). Further alternatively, a metal film that transmits part of light and reflects another part of light can be used for the third electrode 551(*i*, *j*). Accordingly, the second display element 550(*i*, *j*) can have a microcavity structure. As a result, light of a predetermined wavelength can be extracted more efficiently than light of other wavelengths.

For example, a material that can be used for the wiring or the like can be used for the fourth electrode 552. Specifically, a material that reflects visible light can be used for the fourth electrode 552.

<Driver Circuit GD>

Any of a variety of sequential circuits, such as a shift register, can be used as the driver circuit GD. For example, the transistor MD, a capacitor, and the like can be used in the driver circuit GD. Specifically, a transistor including a semiconductor film that can be formed in the same process as the semiconductor film of the transistor M or the transistor which can be used as the switch SW1 can be used.

As the transistor MD, a transistor having a different structure from the transistor that can be used as the switch SW1 can be used, for example. Specifically, a transistor including the conductive film 524 can be used as the transistor MD (see FIG. 12B).

Note that the transistor MD can have the same structure as the transistor M.

<Transistor>

For example, semiconductor films formed at the same step can be used for transistors in the driver circuit and the pixel circuit.

As the transistor in the driver circuit or the pixel circuit, a bottom-gate transistor or a top-gate transistor can be used, for example.

A manufacturing line for a bottom-gate transistor including amorphous silicon as a semiconductor can be easily remodeled into a manufacturing line for a bottom-gate transistor including an oxide semiconductor as a semiconductor, for example. Furthermore, for example, a manufacturing line for a top-gate transistor including polysilicon as a semiconductor can be easily remodeled into a manufacturing line for a top-gate transistor including an oxide semiconductor as a semiconductor. In any reconstruction, a conventional manufacturing line can be effectively used.

For example, a transistor including a semiconductor containing an element belonging to Group 14 can be used. Specifically, a semiconductor containing silicon can be used for a semiconductor film. For example, single crystal silicon, polysilicon, microcrystalline silicon, or amorphous silicon can be used for the semiconductor film of the transistor.

Note that the temperature required for forming a transistor using polysilicon in a semiconductor is lower than the temperature required for forming a transistor using single crystal silicon in a semiconductor.

In addition, the transistor using polysilicon in a semiconductor has higher field-effect mobility than the transistor using amorphous silicon in a semiconductor, and therefore a pixel including the transistor using polysilicon can have a high aperture ratio. Moreover, pixels arranged at high resolution, a gate driver circuit, and a source driver circuit can be formed over the same substrate. As a result, the number of components included in an electronic device can be reduced.

In addition, the transistor using polysilicon as a semiconductor has higher reliability than the transistor using amorphous silicon as a semiconductor.

Alternatively, a transistor including a compound semiconductor can be used. Specifically, a semiconductor containing gallium arsenide can be used for a semiconductor film.

Alternatively, a transistor including an organic semiconductor can be used. Specifically, an organic semiconductor containing any of polyacenes and graphene can be used for the semiconductor film.

For example, a transistor using an oxide semiconductor for a semiconductor film can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon for a semiconductor film can be used. Specifically, a transistor that uses an oxide semiconductor in a semiconductor film can be used.

Thus, a pixel circuit can hold an image signal for a longer time than a pixel circuit including a transistor that uses amorphous silicon for a semiconductor film. Specifically, the selection signal can be supplied at a frequency lower than 30 Hz, preferably lower than 1 Hz, further preferably less than once per minute while flickering is suppressed. Consequently, eyestrain on a user of the information processing device can be reduced, and power consumption for driving can be reduced.

For example, a transistor including a semiconductor film 508, a conductive film 504, a conductive film 512A, and a conductive film 512B can be used as the switch SW1 (see FIG. 13B). The insulating film 506 includes a region positioned between the semiconductor film 508 and the conductive film 504.

The conductive film 504 includes a region overlapping with the semiconductor film 508. The conductive film 504 functions as a gate electrode. The insulating film 506 functions as a gate insulating film.

The conductive films 512A and 512B are electrically connected to the semiconductor film 508. Furthermore, the conductive film 512A has one of a function as a source electrode and a function as a drain electrode, and the conductive film 512B has the other.

Furthermore, a transistor including the conductive film 524 can be used as the transistor included in the driver circuit or the pixel circuit (see FIG. 12B). The semiconductor film 508 is sandwiched between the conductive film 504 and a region included in the conductive film 524. The insulating film 516 includes a region positioned between the conductive film 524 and the semiconductor film 508. For example, the conductive film 524 is electrically connected to a wiring that supplies the same potential as that supplied to the conductive film 504.

A conductive film in which a 10-nm-thick film containing tantalum and nitrogen and a 300-nm-thick film containing copper are stacked can be used as the conductive film 504, for example. A film containing copper includes a region provided so that a film containing tantalum and nitrogen is positioned between the film containing copper and the insulating film 506.

A material in which a 400-nm-thick film containing silicon and nitrogen and a 200-nm-thick film containing silicon, oxygen, and nitrogen are stacked can be used for the insulating film 506, for example. Note that the film containing silicon and nitrogen includes a region provided so that the film containing silicon, oxygen, and nitrogen is positioned between the film containing silicon and nitrogen and the semiconductor film 508.

A 25-nm-thick film containing indium, gallium, and zinc can be used as the semiconductor film 508, for example.

For example, a conductive film in which a 50-nm-thick film containing tungsten, a 400-nm-thick film containing aluminum, and a 100-nm-thick film containing titanium are stacked in this order can be used as the conductive film 512A or 512B. Note that the film containing tungsten includes a region in contact with the semiconductor film 508.

Note that this embodiment can be combined with any of the other embodiments in this specification as appropriate.

Embodiment 4

In this embodiment, a structure of an input/output device which is one embodiment of the present invention will be described with reference to FIG. 17, FIGS. 18A to 18C, FIGS. 19A and 19B, and FIG. 20.

Figure 17:
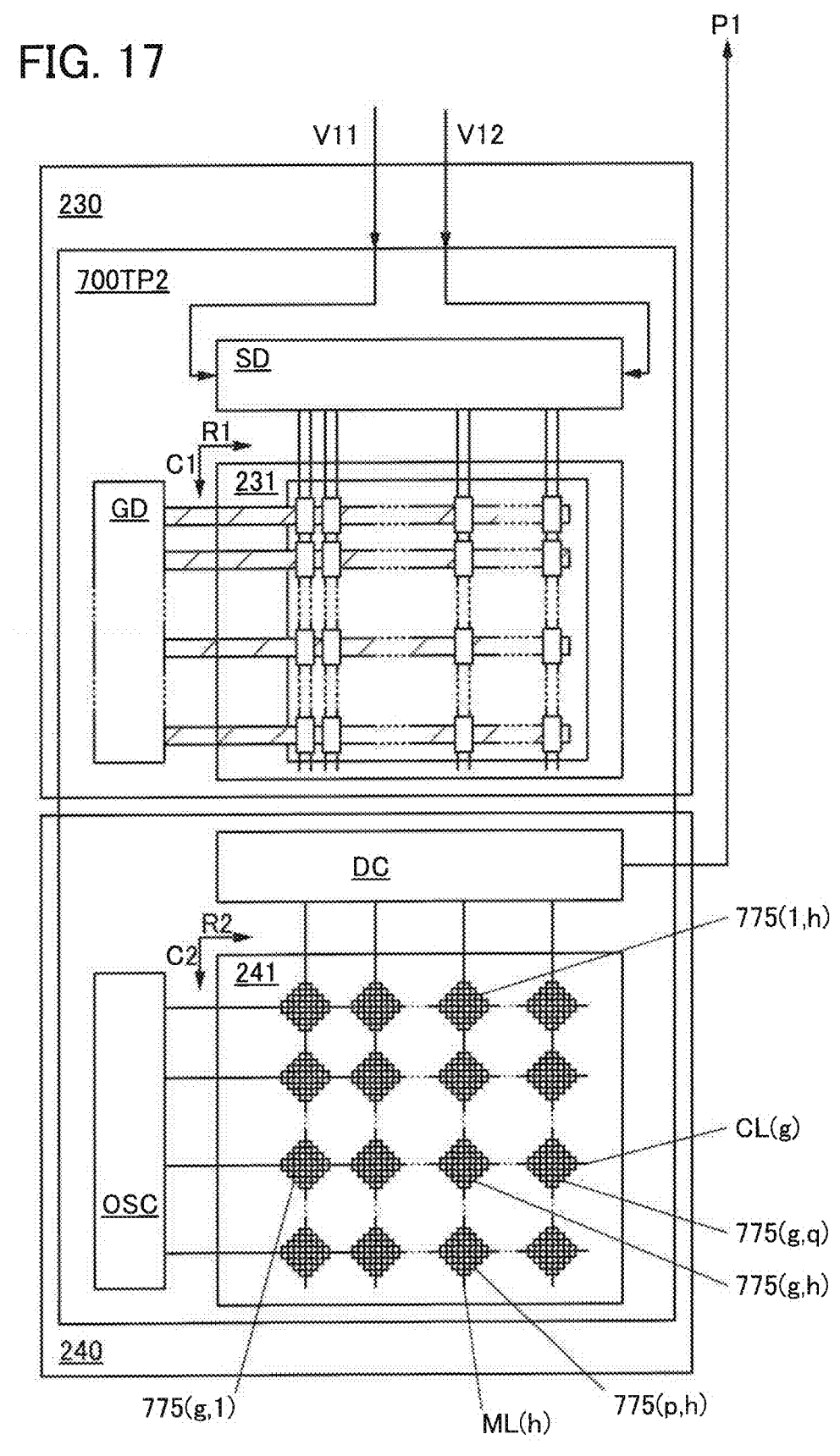

FIG. 17 is a block diagram illustrating a structure of the input/output device of one embodiment of the present invention.

Figure 18A:
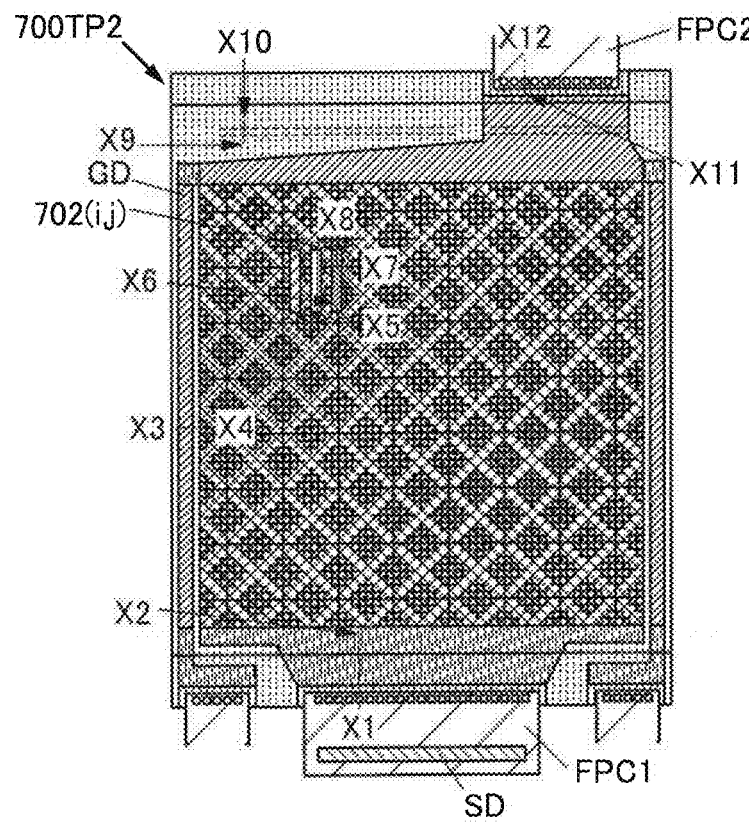
FIGS. 18A to 18C illustrate a structure of an input/output panel that can be used in an input/output device of one embodiment.
Figure 18B:
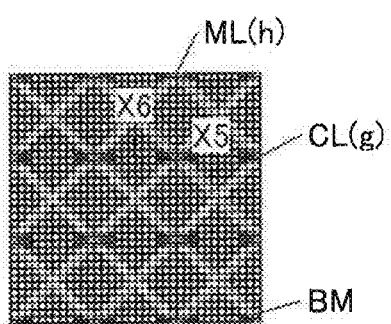
Figure 18C:
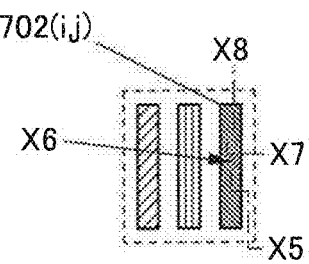

FIGS. 18A to 18C illustrate the structure of the input/output panel which can be used for the input/output device of one embodiment of the present invention. FIG. 18A is a top view of the input/output panel. FIG. 18B is a schematic view illustrating part of an input portion of the input/output panel. FIG. 18C is a schematic view illustrating the structure of the pixel 702($i$, $j$) which can be used for the input/output device.

Figures 19A, 19B:
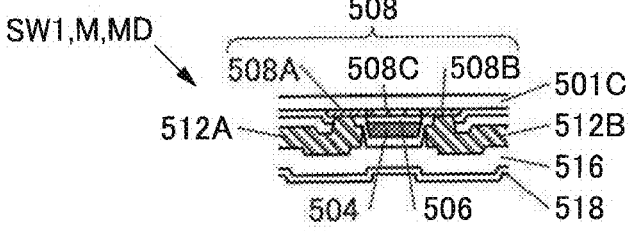
FIGS. 19A and 19B illustrate a structure of an input/output panel that can be used in an input/output device of one embodiment.
Figure 20:
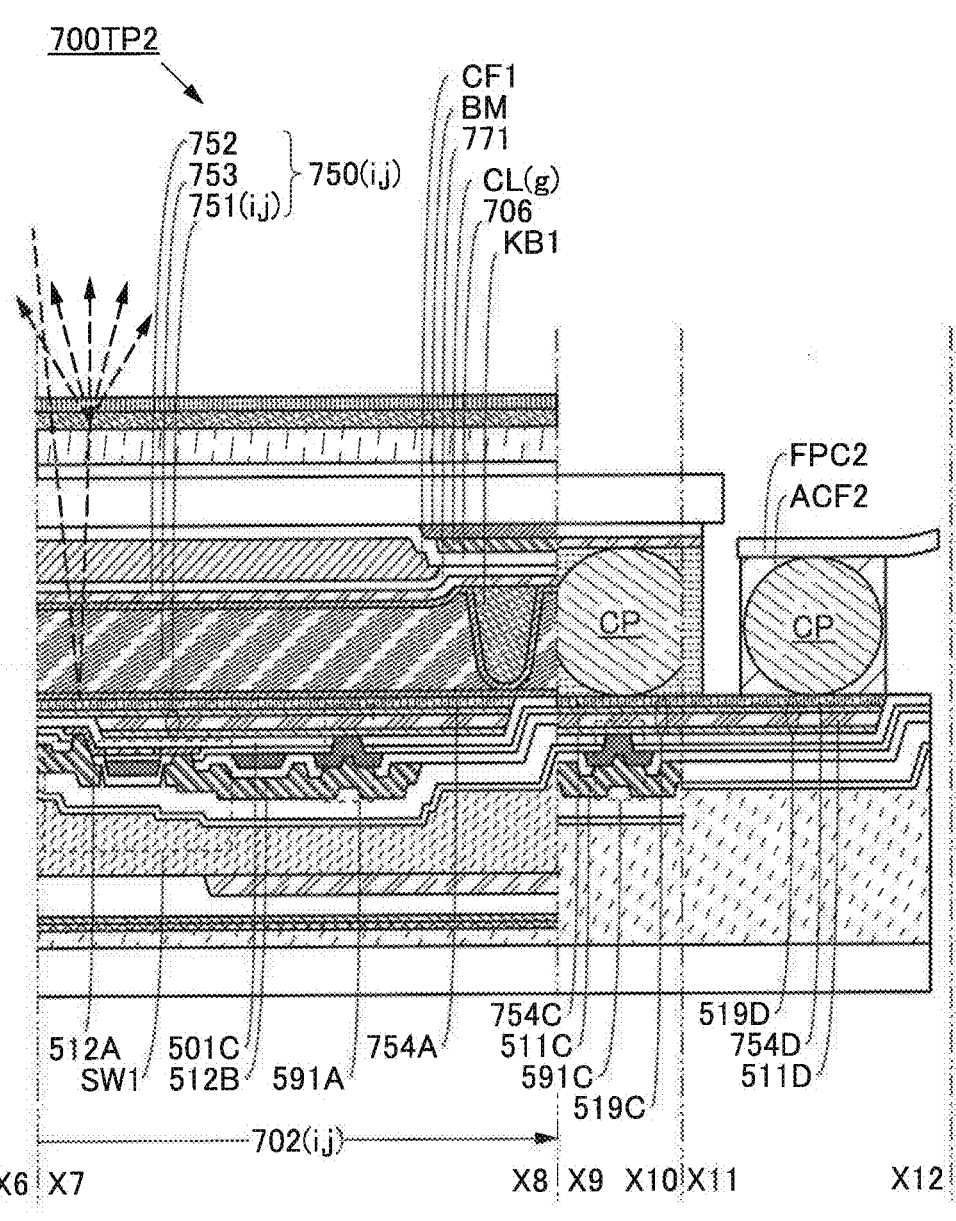
FIG. 20 illustrates a structure of an input/output panel that can be used in an input/output device of one embodiment.

FIGS. 19A and 19B and FIG. 20 illustrate the structure of the input/output panel that can be used in the input/output device of one embodiment of the present invention. FIG. 19A is a cross-sectional view taken along lines X1-X2, X3-X4, and X5-X6 in FIG. 18A. FIG. 19B is a cross-sectional view illustrating part of the structure illustrated in FIG. 19A.

FIG. 20 is a cross-sectional view taken along X7-X8, X9-X10, and X11-X12 in FIG. 18A.

Structure Example 1 of Input/Output Device

The input/output device described in this embodiment includes a display portion 230 and an input portion 240 (see FIG. 17). Note that the input/output device includes an input/output panel 700TP.

The input portion 240 includes a sensor region 241, and the sensor region 241 includes a region overlapping with the display region 231 in the display portion 230. The sensor region 241 has a function of sensing an object that approaches a region overlapping with the display region 231 (see FIG. 19A).

<Input Portion 240>

The input portion 240 includes the sensor region 241, an oscillator circuit OSC, and a sensor circuit DC (see FIG. 17).

The sensor region 241 includes one group of sensor elements 775($g$, 1) to 775($g$, $q$) and another group of sensor elements 775(1, h) to 775($p$, h) (see FIG. 17). Note that g is an integer greater than or equal to 1 and less than or equal to p, h is an integer greater than or equal to 1 and less than or equal to q, and each of p and q is an integer greater than or equal to 1.

The one group of the sensing elements 775($g$, 1) to 775($g$, $q$) include the sensing element 775($g$, h). The sensing elements 775($g$, 1) to 775($g$, $q$) are arranged in a row direction (indicated by the arrow R2 in the drawing). Note that the direction indicated by the arrow R2 in FIG. 17 may be the same as or different from the direction indicated by the arrow R1 in FIG. 17.

The another group of sensing elements 775(1, h) to 775($p$, h) include the sensing element 775($g$, h) and are provided in the column direction (the direction indicated by the arrow C2 in the drawing) that intersects the row direction.

The one group of sensor elements 775($g$, 1) to 775($g$, $q$) arranged in the row direction include an electrode C(g) that is electrically connected to a control line CL(g) (see FIG. 19A).

The another group of sensing elements 775(1, h) to 775($p$, h) provided in the column direction include the electrode M(h) that is electrically connected to the sensor signal line ML(h).

<Sensing Element 775($g$, h)>

The sensing element 775($g$, h) is electrically connected to the control line CL(g) and the sensor signal line ML(h).

The sensing element 775(g, h) has a light-transmitting property. The sensing element 775(g, h) includes an electrode C(g) and an electrode M(h).

A conductive film having an opening at a region overlapping with the pixel 702(i, j), for example, can be used for the electrodes C(g) and M(h). Accordingly, an object that comes in the vicinity of a region overlapping with the input/output panel can be sensed without disturbing display of the input/output panel. Moreover, the thickness of the input/output device can be reduced. As a result, a novel input/output device with high convenience or high reliability can be provided.

The electrode C(g) is electrically connected to the control line CL(g).

The electrode M(h) is electrically connected to the sensor signal line ML(h) and is positioned so that an electric field part of which is blocked by an object approaching a region overlapping with the input/output panel 700 is generated between the electrode M(h) and the electrode C(g). The layer 753 containing a liquid crystal material is provided between the electrode C(g) and the electrode M(h).

In each of the input/output panel 700TP and the input/output panel 3554 described in Embodiment 2 (see FIG. 4B), a liquid crystal display element can be driven by a driving method with a VA mode.

Note that the control line CL(g) has a function of supplying a control signal.

The sensor signal line ML(h) has a function of receiving the sensor signal.

The sensor element 775(g, h) has a function of supplying a sensor signal that changes in accordance with a control signal and a distance from an object approaching the region overlapping with the input/output panel 700.

Thus, the object approaching the region overlapping with the input/output device can be sensed while the image data is displayed on the input/output device. As a result, a novel input/output device with high convenience or high reliability can be provided.

<Oscillator Circuit OSC>

The oscillator circuit OSC is electrically connected to the control line CL(g) and has a function of supplying a control signal. For example, a rectangular wave, a sawtooth wave, a triangular wave, or the like can be used as the control signal.

<Sensor Circuit DC>

The sensor circuit DC is electrically connected to the sensor signal line ML(h) and has a function of supplying a sensor signal on the basis of a change in the potential of the sensor signal line ML(h). Note that the sensor signal includes positional data P1, for example.

<Display Portion 230>

The input/output device described in Embodiment 2 can be used in the display portion 230.

<Input/Output Panel 700TP>

The input/output panel 700TP is different from, for example, the input/output panel 700 described in Embodiment 3 in that the sensor element 775(g, h) and a top-gate transistor are provided. Different structures will be described in detail below, and the above description is referred to for the other similar structures.

The input/output panel 700TP includes the control line CL(g) and the sensor signal line ML(h).

<Conductive Film 511D>

The input/output panel 700TP described in this embodiment includes a conductive film 511D (see FIG. 20).

Note that a conductive material CP or the like can be provided between the control line CL(g) and the conductive film 511D to electrically connect the control line CL(g) and the conductive film 511D. Alternatively, the conductive material CP or the like can be provided between the sensor signal line ML(h) and the conductive film 511D to electrically connect the sensor signal line ML(h) and the conductive film 511D. A material that can be used for the wiring or the like can be used for the conductive film 511D, for example.

<Terminal 519D>

The input/output panel 700TP described in this embodiment includes a terminal 519D. The terminal 519D is electrically connected to the conductive film 511D.

The terminal 519D is provided with the conductive film 511D and an intermediate film 754D, and the intermediate film 754D includes a region in contact with the conductive film 511D.

For example, a material that can be used for a wiring or the like can be used for the terminal 519D. Specifically, the terminal 519D can have the same structure as that of the terminal 519B or the terminal 519C (see FIG. 20).

Note that for example, the terminal 519D can be electrically connected to a flexible printed circuit FPC2 using a conductive material ACF2, for example. Thus, a control signal can be supplied to the control line CL(g) with use of the terminal 519D, for example. Alternatively, a sensor signal can be supplied from the sensor signal line ML(h) with use of the terminal 519D.

<Switch SW1, Transistor M, Transistor MD>

A transistor that can be used for the switch SW1, the transistor M, and the transistor MD include the conductive film 504 having a region overlapping with the insulating film 501C and the semiconductor film 508 having a region located between the insulating film 501C and the conductive film 504. Note that the conductive film 504 functions as a gate electrode (see FIG. 19B).

The semiconductor film 508 includes a first region 508A, a second region 508B, and a third region 508C. The first region 508A and the second region 508B do not overlap with the conductive film 504. The third region 508C is positioned between the first region 508A and the second region 508B and overlaps with the conductive film 504.

The transistor MD includes the insulating film 506 between the third region 508C and the conductive film 504. Note that the insulating film 506 functions as a gate insulating film.

The first region 508A and the second region 508B have a lower resistivity than the third region 508C, and function as a source region and a drain region.

For example, plasma treatment using a gas containing a rare gas is performed on the oxide semiconductor film, whereby the first region 508A and the second region 508B can be formed in the semiconductor film 508.

For example, the conductive film 504 can be used as a mask. The use of the conductive film 504 as a mask allows the shape of part of the third region 508C to be self-aligned with the shape of an end of the conductive film 504.

The transistor MD includes the conductive film 512A and the conductive film 512B that are in contact with the first region 508A and the second region 508B, respectively. The conductive film 512A and the conductive film 512B function as a source electrode and a drain electrode.

For example, a transistor that can be fabricated in the same process as the transistor MD can be used as the transistor M.

Note that this embodiment can be combined with any of the other embodiments in this specification as appropriate.

Embodiment 5

Figure 21A:
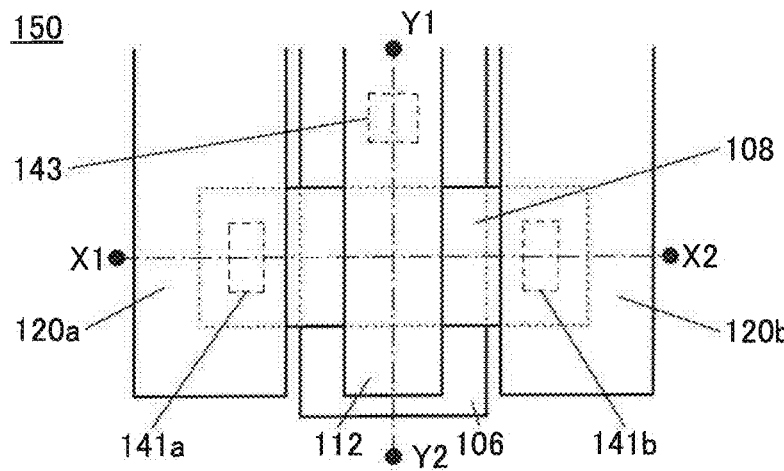
FIGS. 21A to 21C illustrate a structure of a transistor that can be used in an input/output device of one embodiment.
Figure 21B:
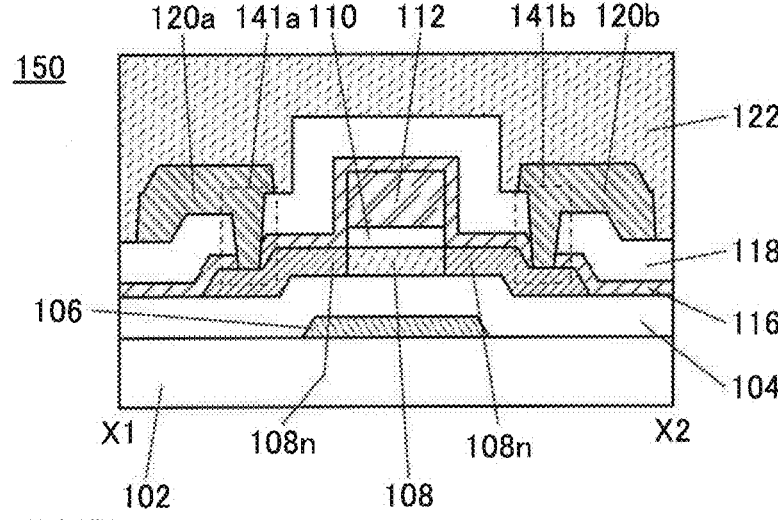
Figure 21C:
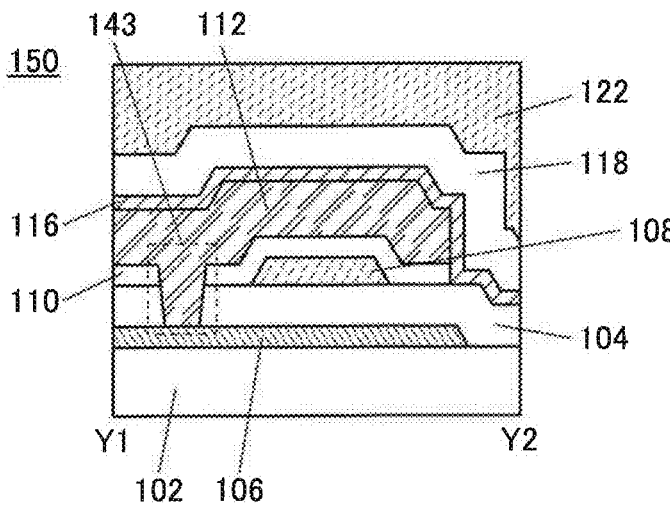

In this embodiment, a structure of a transistor typified by the transistor 3521 in the input/output panel of one embodiment of the present invention will be described with reference to FIGS. 21A to 21C. In particular, a transistor including two electrodes will be described. FIG. 21A is a top view of a transistor 150. FIG. 21B is a cross-sectional view taken along dashed-dotted line X1-X2 in FIG. 21A. FIG. 21C is a cross-sectional view taken along dashed-dotted line Y1-Y2 in FIG. 21A.

The transistor 150 illustrated in FIGS. 21A to 21C includes the following components: a conductive film 106 over a substrate 102; an insulating film 104 over the conductive film 106; the oxide semiconductor film 108 over the insulating film 104; the insulating film 110 over an oxide semiconductor film 108; a conductive film 112 over the insulating film 110; and an insulating film 116 over the insulating film 104, the oxide semiconductor film 108, and the conductive film 112.

The oxide semiconductor film 108 has a structure similar to that described in the other embodiments. The transistor 150 illustrated in FIGS. 21A to 21C includes a conductive film 106, an opening 141*a*, an opening 141*b*, and an opening 143. In the opening 141*a*, a conductive film 120*a* is in contact with an oxide semiconductor film 108*n*. In the opening 141*b*, a conductive film 120*b* is in contact with the oxide semiconductor film 108*n*.

Note that the opening 143 is provided in the insulating films 104 and 110. The conductive film 106 is electrically connected to the conductive film 112 through the opening 143. Thus, the same potential is applied to the conductive film 106 and the conductive film 112. Note that different potentials may be applied to the conductive film 106 and the conductive film 112 without providing the opening 143. Alternatively, the conductive film 106 may be used as a light-shielding film without providing the opening 143. When the conductive film 106 is formed using a light-blocking material, for example, light irradiating the oxide semiconductor film 108 from the bottom can be reduced.

In the case of using the transistor 150, the conductive film 106 functions as a first gate electrode (also referred to as bottom gate electrode), and the conductive film 112 functions as a second gate electrode (also referred to as top gate electrode). The insulating film 104 functions as a first gate insulating film, and the insulating film 110 functions as a second gate insulating film.

The conductive film 106 can be formed using a material similar to the above-described materials of the conductive films 112, 120*a*, and 120*b*. It is particularly suitable to use a material containing copper for the conductive film 106 because the resistance can be reduced. It is suitable that, for example, each of the conductive films 106, 120*a*, and 120*b* has a stacked-layer structure in which a copper film is over a titanium nitride film, a tantalum nitride film, or a tungsten film. In that case, by using the transistor 150 as a pixel transistor and/or a driving transistor of an input/output device, parasitic capacitance generated between the conductive films 106 and 120*a* and between the conductive films 106 and 120*b* can be reduced. Thus, the conductive films 106, 120*a*, and 120*b* can be used not only as the first gate electrode, the source electrode, and the drain electrode of the transistor 150, but also as power source supply wirings, signal supply wirings, connection wirings, or the like of the input/output device.

In this manner, the transistor 150 in FIGS. 21A to 21C has a structure in which a conductive film functioning as a gate electrode is provided over and under the oxide semiconductor film 108. As in the transistor 150, a semiconductor device of one embodiment of the present invention may have a plurality of gate electrodes.

As illustrated in FIGS. 21B and 21C, the oxide semiconductor film 108 faces the conductive film 106 functioning as the first gate electrode and the conductive film 112 functioning as the second gate electrode and is positioned between the two conductive films functioning as the gate electrodes.

Furthermore, the length of the conductive film 112 in the channel width direction is larger than the length of the oxide semiconductor film 108 in the channel width direction. In the channel width direction, the whole oxide semiconductor film 108 is covered with the conductive film 112 with the insulating film 110 placed therebetween. Since the conductive film 112 is connected to the conductive film 106 through the opening 143 provided in the insulating films 104 and 110, a side surface of the oxide semiconductor film 108 in the channel width direction faces the conductive film 112 with the insulating film 110 placed therebetween.

In other words, the conductive film 106 and the conductive film 112 are connected through the opening 143 provided in the insulating films 104 and 110, and each include a region positioned outside an edge portion of the oxide semiconductor film 108.

Such a structure enables the oxide semiconductor film 108 included in the transistor 150 to be electrically surrounded by electric fields of the conductive film 106 functioning as the first gate electrode and the conductive film 112 functioning as the second gate electrode. A device structure of a transistor, like that of the transistor 150, in which electric fields of the first gate electrode and the second gate electrode electrically surround the oxide semiconductor film 108 in which a channel region is formed can be referred to as a surrounded channel (S-channel) structure.

Since the transistor 150 has the S-channel structure, an electric field for inducing a channel can be effectively applied to the oxide semiconductor film 108 by the conductive film 106 or the conductive film 112; thus, the current drive capability of the transistor 150 can be improved and high on-state current characteristics can be obtained. Since the on-state current can be increased, it is possible to reduce the size of the transistor 150. Furthermore, since the transistor 150 has a structure in which the oxide semiconductor film 108 is surrounded by the conductive film 106 and the conductive film 112, the mechanical strength of the transistor 150 can be increased.

When seen in the channel width direction of the transistor 150, an opening different from the opening 143 may be formed on the side of the oxide semiconductor film 108 on which the opening 143 is not formed.

When a transistor has a pair of gate electrodes between which a semiconductor film is positioned as in the transistor 150, one of the gate electrodes may be supplied with a signal A, and the other gate electrode may be supplied with a fixed potential $V_b$. Alternatively, one of the gate electrodes may be supplied with the signal A, and the other gate electrode may be supplied with a signal B. Alternatively, one of the gate electrodes may be supplied with a fixed potential $V_a$, and the other gate electrode may be supplied with the fixed potential $V_b$.

The signal A is, for example, a signal for controlling the on/off state. The signal A may be a digital signal with two kinds of potentials, a potential $V_1$ and a potential $V_2$ ($V_1 > V_2$). For example, the potential $V_1$ can be a high power supply potential, and the potential $V_2$ can be a low power supply potential. The signal A may be an analog signal.

The fixed potential $V_b$ is, for example, a potential for controlling a threshold voltage $V_{thA}$ of the transistor. The fixed potential $V_b$ may be the potential $V_1$ or the potential $V_2$. In that case, a potential generator circuit for generating the fixed potential $V_b$ is not necessary, which is preferable. The fixed potential $V_b$ may be different from the potential $V_1$ or the potential $V_2$. When the fixed potential $V_b$ is low, the threshold voltage $V_{thA}$ can be high in some cases. As a result, the drain current flowing when the gate-source voltage $V_{gs}$ is 0 V can be reduced, and leakage current in a circuit including the transistor can be reduced in some cases. The fixed potential $V_b$ may be, for example, lower than the low power supply potential. On the other hand, in some cases, the threshold voltage $V_{thA}$ can be low by setting the fixed potential $V_b$ high. As a result, drain current generated when the gate-source voltage $V_{gs}$ is a high power supply potential can be increased and the operating speed of the circuit including the transistor can be improved in some cases. The fixed potential $V_b$ may be, for example, higher than the low power supply potential.

The signal B is, for example, a signal for controlling the on/off state. The signal B may be a digital signal with two kinds of potentials, a potential $V_3$ and a potential $V_4$ ($V_3 > V_4$). For example, the potential $V_3$ can be a high power supply potential, and the potential $V_4$ can be a low power supply potential. The signal B may be an analog signal.

When both the signal A and the signal B are digital signals, the signal B may have the same digital value as the signal A. In this case, it may be possible to increase the on-state current of the transistor and the operating speed of the circuit including the transistor. Here, the potential $V_1$ and the potential $V_2$ of the signal A may be different from the potential $V_3$ and the potential $V_4$ of the signal B. For example, if a gate insulating film for the gate to which the signal B is input is thicker than a gate insulating film for the gate to which the signal A is input, the potential amplitude of the signal B ($V_3 - V_4$) may be larger than the potential amplitude of the signal A ($V_1 - V_2$). In this manner, the influence of the signal A and that of the signal B on the on/off state of the transistor can be substantially the same in some cases.

When both the signal A and the signal B are digital signals, the signal B may have a digital value different from that of the signal A. In this case, the signal A and the signal B can separately control the transistor, and thus, higher performance can be achieved. The transistor which is, for example, an n-channel transistor can function by itself as a NAND circuit, a NOR circuit, or the like in the following case: the transistor is turned on only when the signal A has the potential $V_1$ and the signal B has the potential $V_3$, or the transistor is turned off only when the signal A has the potential $V_2$ and the signal B has the potential $V_4$. The signal B may be a signal for controlling the threshold voltage $V_{thA}$. For example, the potential of the signal B in a period in which the circuit including the transistor operates may be different from the potential of the signal B in a period in which the circuit does not operate. The potential of the signal B may vary depending on the operation mode of the circuit. In this case, the potential of the signal B is not necessarily changed as frequently as the potential of the signal A.

When both the signal A and the signal B are analog signals, the signal B may be an analog signal having the same potential as the signal A, an analog signal whose potential is a constant times the potential of the signal A, an analog signal whose potential is higher or lower than the potential of the signal A by a constant, or the like. In this case, it may be possible to increase the on-state current of the transistor and the operating speed of the circuit including the transistor. The signal B may be an analog signal different from the signal A. In this case, the signal A and the signal B can separately control the transistor, and thus, higher performance can be achieved.

The signal A may be a digital signal, and the signal B may be an analog signal. Alternatively, the signal A may be an analog signal, and the signal B may be a digital signal.

When both of the gate electrodes of the transistor are supplied with the fixed potentials, the transistor can function as an element equivalent to a resistor in some cases. For example, in the case where the transistor is an n-channel transistor, the effective resistance of the transistor can be sometimes low (high) when the fixed potential $V_a$ or the fixed potential $V_b$ is high (low). When both the fixed potential $V_a$ and the fixed potential $V_b$ are high (low), the effective resistance can be lower (higher) than that of a transistor with only one gate in some cases. An insulating film may further be formed over the transistor 150. The transistor 150 illustrated in FIGS. 21A to 21C includes an insulating film 122 over the conductive films 120a and 120b and the insulating film 118.

The insulating film 122 has a function of covering unevenness and the like caused by the transistor or the like. The insulating film 122 has an insulating property and is formed using an inorganic material or an organic material. Examples of the inorganic material include a silicon oxide film, a silicon oxynitride film, a silicon nitride oxide film, a silicon nitride film, an aluminum oxide film, and an aluminum nitride film. Examples of the organic material include photosensitive resin materials such as an acrylic resin and a polyimide resin.

Note that this embodiment can be combined with any of the other embodiments in this specification as appropriate.

Embodiment 6

In this embodiment, electronic devices each of which includes the input/output device of one embodiment of the present invention will be described with reference to FIGS. 22A to 22H.

FIGS. 22A to 22G illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like. In addition, each electronic device can include at least one of a keyboard, a hardware button, a pointing device, a touch sensor, an illuminance sensor, an imaging device, an audio input device, a viewpoint input device, and a pose detection device.

Figures 22A, 22B, 22C, 22D, 22E, 22F, 22G, 22H:
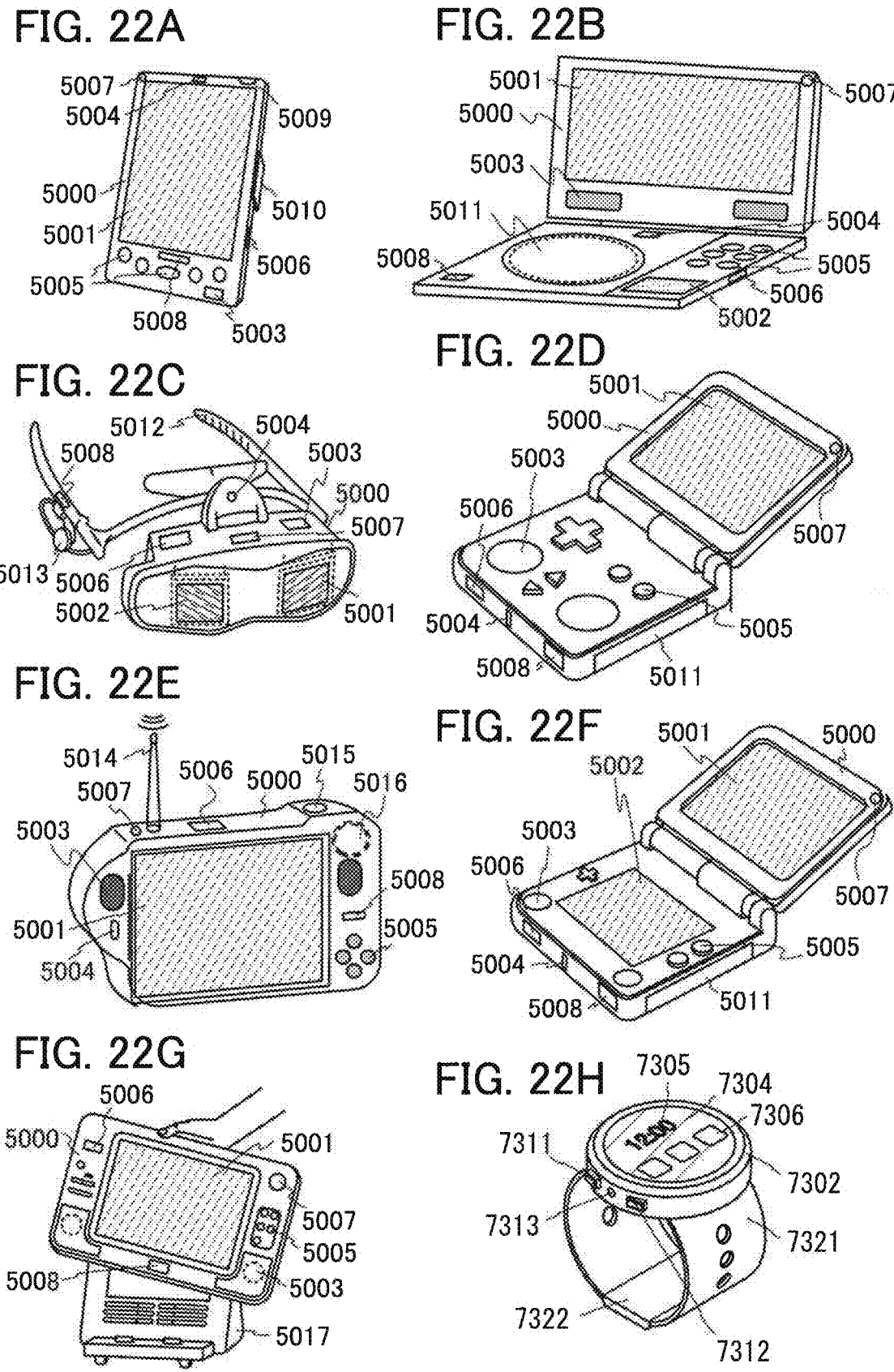
FIGS. 22A to 22H each illustrate an electronic device including an input/output device of one embodiment.

FIG. 22A illustrates a mobile computer, which can include a switch 5009, an infrared port 5010, and the like in addition to the above objects. FIG. 22B illustrates a portable image reproducing device provided with a memory medium (e.g., a DVD reproducing device) that can include a second display portion 5002, a memory medium reading portion 5011, and the like in addition to the above objects. FIG. 22C illustrates a goggle-type display that can include the second display portion 5002, a support portion 5012, an earphone 5013, and the like in addition to the above objects. FIG. 22D illustrates a portable game machine that can include the memory medium reading portion 5011 and the like in addition to the above objects. FIG. 22E illustrates a digital camera with a television receiver function which can include an antenna 5014, a shutter button 5015, an image receiving portion 5016, and the like in addition to the above objects. FIG. 22F illustrates a portable game console that can include the second display portion 5002, the memory medium reading portion 5011, and the like in addition to the above objects. FIG. 22G illustrates a portable television receiver that can include a charger 5017 capable of transmitting and receiving signals, and the like in addition to the above components.

The electronic devices illustrated in FIGS. 22A to 22G can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image information mainly on one display portion while displaying text information on another display portion, a function of displaying a three-dimensional image by displaying images where parallax is considered on a plurality of display portions, or the like. Furthermore, the electronic device including an image receiving portion can have a function of photographing a still image, a function of photographing a moving image, a function of automatically or manually correcting a photographed image, a function of storing a photographed image in a memory medium (an external memory medium or a memory medium incorporated in the camera), a function of displaying a photographed image on the display portion, or the like. Note that functions that can be provided for the electronic devices illustrated in FIGS. 22A to 22G are not limited to those described above, and the electronic devices can have a variety of functions.

FIG. 22H illustrates a smart watch, which includes a housing 7302, an input/output panel 7304, operation buttons 7311 and 7312, a connection terminal 7313, a band 7321, a clasp 7322, and the like.

The input/output panel 7304 mounted in the housing 7302 serving as a bezel includes a non-rectangular display region. The input/output panel 7304 may have a rectangular display region. The input/output panel 7304 can display an icon 7305 indicating time, another icon 7306, and the like.

The smart watch illustrated in FIG. 22H can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion.

The housing 7302 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the smart watch can be manufactured using the light-emitting element for the input/output panel 7304.

Note that this embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y provided therebetween.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path". Another example of the expression is "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

This application is based on Japanese Patent Application Serial No. 2016-138237 filed with Japan Patent Office on Jul. 13, 2016, the entire contents of which are hereby incorporated by reference.

What is claimed is:

1. An input/output device comprising:
a touch sensor comprising:
   a first electrode over a substrate; and
   a second electrode under the substrate;
a liquid crystal element under the substrate, the liquid crystal element comprising:
   a third electrode;
   a fourth electrode; and
   a liquid crystal material;
a fifth electrode; and
an insulating layer under the third electrode and the fourth electrode,
wherein a capacitor is formed between the first electrode and the second electrode,
wherein the substrate and the liquid crystal material are located between the first electrode and the second electrode,
wherein the third electrode is formed on a same layer and using a same material as the fourth electrode,
wherein the second electrode is formed on a same layer and using a same material as the fifth electrode,
wherein the second electrode is spaced apart from the fifth electrode, and
wherein the fifth electrode overlaps with the third electrode and the fourth electrode with the insulating layer sandwiched therebetween.

2. The input/output device according to claim 1, wherein the fourth electrode is a pixel electrode, and wherein the fifth electrode is configured to be supplied with a common potential.

3. The input/output device according to claim 1, wherein the fifth electrode is a pixel electrode, and wherein the third electrode and the fourth electrode are configured to be supplied with a common potential.

4. The input/output device according to claim 1, wherein a surface of the insulating layer comprises a region in contact with the third electrode and a region in contact with the fourth electrode.

5. The input/output device according to claim 1, further comprising a plurality of pixels, wherein each of the plurality of pixels comprises the touch sensor and the liquid crystal element.

6. An input/output device comprising:
a touch sensor comprising:
    a first electrode over a substrate; and
    a second electrode under the substrate;
a liquid crystal element under the substrate, the liquid crystal element comprising:
    a third electrode;
    a fourth electrode; and
    a liquid crystal material;
a fifth electrode; and
an insulating layer under the third electrode and the fourth electrode,
wherein a capacitor is formed between the first electrode and the second electrode,
wherein the substrate and the liquid crystal material are located between the first electrode and the second electrode,
wherein the second electrode is formed on a same layer and using a same material as the third electrode and the fourth electrode,
wherein the second electrode, the third electrode, and the fourth electrode are spaced apart from each other,
wherein the fifth electrode is a pixel electrode, and
wherein the fifth electrode overlaps with the third electrode and the fourth electrode with the insulating layer sandwiched therebetween.

7. The input/output device according to claim 6, wherein the third electrode and the fourth electrode are configured to be supplied with a common potential.

8. The input/output device according to claim 6, further comprising a plurality of pixels, wherein each of the plurality of pixels comprises the touch sensor and the liquid crystal element.

9. An input/output device comprising:
a touch sensor comprising:
    a first electrode over a substrate; and
    a second electrode under the substrate;
a liquid crystal element under the substrate, the liquid crystal element comprising:
    a third electrode;
    a fourth electrode; and
    a liquid crystal material;
a fifth electrode; and
an insulating film under the second electrode, the third electrode, and the fourth electrode,
wherein a capacitor is formed between the first electrode and the second electrode,
wherein the substrate and the liquid crystal element are located between the first electrode and the fifth electrode,
wherein the second electrode is formed on a same layer and using a same material as the third electrode and the fourth electrode,
wherein the third electrode is a pixel electrode electrically connected to one of a source electrode or a drain electrode of a transistor,
wherein the fifth electrode is formed using a same material as a semiconductor layer of the transistor, and
wherein the insulating film is over and in contact with the transistor and the fifth electrode.

10. The input/output device according to claim 9, wherein each of the third electrode, the fourth electrode, and the fifth electrode comprises a conductor transmitting visible light.

11. The input/output device according to claim 9, wherein the insulating film is an nitride insulating film.

12. The input/output device according to claim 9, further comprising a plurality of pixels, wherein each of the plurality of pixels comprises the touch sensor and the liquid crystal element.

* * * * *